US012447617B1

(12) United States Patent
Schuetz et al.

(10) Patent No.: US 12,447,617 B1
(45) Date of Patent: Oct. 21, 2025

(54) RANDOM KEY OPTIMIZATION FOR GENERATING SEQUENCING PLANS

(71) Applicant: Amazon Technologies, Inc., Seattle, WA (US)

(72) Inventors: Martin Schuetz, Brooklyn, NY (US); John Kyle Brubaker, San Diego, CA (US); Mauricio Resende, Seattle, WA (US); Helmut Gottfried Katzgraber, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 406 days.

(21) Appl. No.: 18/066,983

(22) Filed: Dec. 15, 2022

(51) Int. Cl.
  *B25J 9/16* (2006.01)
  *G06N 10/80* (2022.01)
(52) U.S. Cl.
  CPC .......... *B25J 9/1664* (2013.01); *G06N 10/80* (2022.01)
(58) Field of Classification Search
  CPC ............................. B25J 9/1664; G06N 10/80
  USPC ......................................................... 700/245
  See application file for complete search history.

(56) References Cited

U.S. PATENT DOCUMENTS

| 10,759,051 | B2 | 9/2020 | Tan et al. | |
| 11,480,049 | B2 * | 10/2022 | Chen | E21B 7/067 |
| 2021/0220994 | A1 * | 7/2021 | Colasanto | B25J 9/1682 |
| 2021/0252707 | A1 | 8/2021 | Wang et al. | |
| 2021/0308865 | A1 * | 10/2021 | Lin | B25J 9/1651 |
| 2021/0390159 | A1 * | 12/2021 | De Carvalho, Jr. | G06N 5/01 |
| 2022/0063099 | A1 * | 3/2022 | Lin | B25J 9/1612 |

OTHER PUBLICATIONS

M. W. Johnson, M. H. S. Amin, S. Gildert, T. Lanting, F. Hamze, N. Dickson, R. Harris, A. J. Berkley, J. Johansson, P. Bunyk, et al., "Quantum annealing with manufactured spins," Nature 473, pp. 194-198 (2011).
P. Bunyk, E. Hoskinson, M. W. Johnson, E. Tolkacheva, F. Altomare, A. J. Berkley, R. Harris, J. P. Hilton, T. Lanting, and J. Whittaker, "Architectural Considerations in the Design of a Superconducting Quantum Annealing Processor", IEEE Trans. Appl. Supercond. 24, 1 (2014) (arXiv:1401.5504v1), pp. 1-9.
H. G. Katzgraber, "Viewing vanilla quantum annealing through spin glasses", IOP Publishing, Quantum Science and Technology 3, 030505 (2018), pp. 1-10.
P. Hauke, H. G. Katzgraber, W. Lechner, H. Nishimori, and W. Oliver, Perspectives of quantum annealing: methods and implementations, Rep. Prog. Phys. 83, 054401 (2020) (rXiv: 1903.06559v1 [quant-ph] Mar. 15, 2019 pp. 1-37).

(Continued)

*Primary Examiner* — Kira Nguyen
(74) *Attorney, Agent, or Firm* — S. Scott Foster; Kowert, Hood, Munyon, Rankin & Goetzel, P.C.

(57) ABSTRACT

Random key optimization is used to generate sequencing plans. An optimization problem is obtained to generate a sequencing plan. The optimization problem may be described according to nodes that represent decision variables of the optimization problem. A random optimization key technique may be applied to determine a vector of respective values for the nodes. The vector of respective values of the nodes may be decoded according to a sequence planning constraint to generate the sequencing plan and determine a fitness score for the sequencing plan.

20 Claims, 10 Drawing Sheets

(56) References Cited

OTHER PUBLICATIONS

J. R. Finzgar, P. Ross, J. Klepsch, and A. Luckow, Quark: A framework for quantum computing application benchmarking (2022), 2202.03028, arXiv:2202.03028v3, pp. 1-12.
A. Luckow, J. Klepsch, and J. Pichlmeier, Quantum computing: Towards industry reference problems, Digitale Welt 5, 38 (2021), rXiv:2103.07433v1, pp. 1-12.
J. Klepsch, J. Kopp, A. Luckow, H. Weiss, B. Standen, D. Vozl, C. Utschig-Utschig, M. Streif, T. Strohm, H. Ehm, et al., Industry quantum applications, https://www.qutac.de/wp-content/uploads/2021/07/QUTAC_Paper.pdf (2021), pp. 1-33.
J. C. Bean, Genetic algorithms and random keys for sequencing and optimization, ORSA Journal on Computing 6, pp. 154-160 (1994).
R. F. Toso and M. G. C. Resende, A C++ application programming interface for biased random-key genetic algorithms, Optimization Methods and Software 30, 81 (2015), URL https://doi.org/10.1080/10556788.2014.890197, pp. 1-15.
C. E. Andrade, R. F. Toso, J. F. Gonçalves, and M. G. C. Resende, The multi-parent biased random-key genetic algorithm with implicit path-relinking and its real-world applications, European Journal of Operational Research 289, 17 (2021), URL https://www.sciencedirect.com/science/article/pii/S0377221719309488. pp. 1-31.
M. G. C. Resende, R. F. Toso, J. F. Gonçalves, and R. M. A. Silva, A biased random-key genetic algorithm for the Steiner triple covering problem, Optimization Letters 6, 605â619 (2012), URL https://doi.org/10.1007/11590-011-0285-3, pp. 1-15.
J. F. Gonçalves and M. G. C. Resende, A parallel multi-population biased random-key genetic algorithm for a container loading problem, Computers & Operations Research 39, 179 (2012), URL https://www.sciencedirect.com/science/article/pii/S0305054811000827, pp. 1-17.
M. Luby, A. Sinclair, and D. Zuckerman, Optimal speedup of las vegas algorithms, Information Processing Letters vol. 47, Issue 4, pp. 173-180 (1993), downloaded from https://www.cs.utexas.edu/~diz/pubs/speedup.pdf, pp. 1-13.
M. G. C. Resende, L. Morán-Mirabal, J. L. Gonzalez-Velarde, and R. F. Toso, Restart strategy for biased random-key genetic algorithms (2013), MIC 2013: The X Metaheuristics International Conference, http://mauricio.resende.info/doc/borkga-restart.pdf, pp. 1-3.
M. L. Lucena, C. E. Andrade, M. G. C. Resende, and F. K. Miyazawa, "Some extensions of biased random-key genetic algorithms," in Proceedings of the XLVI Symposium of the Brazilian Operational Research Society (2014), pp. 2469-2480.
P. Virtanen, R. Gommers, T. E. Oliphant, M. Haberland, T. Reddy, D. Cournapeau, E. Burovski, P. Peterson, W. Weckesser, J. Bright, et al., SciPy 1.0: Fundamental Algorithms for Scientific Computing in Python, Nature Methods 17, 261 (2020).
C. Tsallis and D. A. Stariolo, Generalized simulated annealing, Physica A: Statistical Mechanics and its Applications 233, 395 (1996), ISSN 0378-4371, URL https://www.sciencedirect.com/science/article/pii/S0378437196002713, arXiv: cond-mat/9501047 (preprint 1995), pp. 1-13.
Y. Xiang, D. Sun, W. Fan, and X. Gong, Generalized simulated annealing algorithm and its application to the thomson model, Physics Letters A 233, 216 (1997), ISSN 0375-9601, URL https://www.sciencedirect.com/science/article/pii/S037596019700474X, pp. 1-5.
Y. Xiang, S. Gubian, B. Suomela, and J. Hoeng, Generalized simulated annealing for global optimization: The gensa package, Contributed Research Articles, The R Journal vol. 5(1):pp. 13-29, Jun. 2013 5 (2013).
R. H. Byrd, P. Lu, J. Nocedal, and C. Zhu, A limited memory algorithm for bound constrained optimization, Siam J. Sci. Comput. 16, 1190 (1995), retrieved 1994 copy via https://users.iems.northwestern.edu/~nocedal/PDFfiles/limited.pdf, pp. 1-25.
A. Lucas, Ising formulations of many NP problems, Front. Physics 2, 5 (2014), arXiv:1302.5843v3, pp. 1-27.

G. Kochenberger, J.-K. Hao, F. Glover, M. Lewis, Z. Lu, H. Wang, and Y. Wang, The Unconstrained Binary Quadratic Programming Problem: A Survey, Journal of Combinatorial Optimization 28, 58 (2014), pp. 1-33.
F. Glover, G. Kochenberger, and Y. Du, Quantum Bridge Analytics I: A Tutorial on Formulating and Using QUBO Models, 4OR quarterly journal of the Belgian, French and Italian Operations Research Societies • Nov. 2019, pp. 335-371.
M. Anthony, E. Boros, Y. Crama, and A. Gruber, Quadratic reformulations of nonlinear binary optimization problems, Mathematical Programming 162, 115 (2017), pp. 1-31.
E. Ising, "A Contribution to the Theory of Ferromagnetism," ("Beitrag zur Theorie des Ferromagnetismus"), Z. Phys. 31, 253 (1925), retrieved 1924 un-translated version from http://www.icmp.lviv.ua/ising/books/isingshort.pdf, pp. 1-8.
T. Kadowaki and H. Nishimori, Quantum annealing in the transverse Ising model, Phys. Rev. E, vol. 58, No. 5, pp. 5355-5363 (1998).
E. Farhi, J. Goldstone, S. Gutmann, J. Lapan, A. Lundgren, and D. Preda, A quantum adiabatic evolution algorithm applied to random instances of an NP-complete problem, Science 292, 472 (2001), arXiv:quant-ph/0104129, pp. 1-15.
S. V. Isakov, G. Mazzola, V. N. Smelyanskiy, Z. Jiang, S. Boixo, H. Neven, and M. Troyer, Understanding Quantum Tunneling through Quantum Monte Carlo Simulations, Phys. Rev. Lett. 117, 180402 (2016), arXiv:1510.08057v1, pp. 1-15.
V. Choi, Minor-embedding in adiabatic quantum computation. I: The parameter setting problem., Quantum Information Processing vol. 7, pp. 193-209 (2008), arXiv:0804.4884 [quant-ph].
A. Zaribafiyan, D. J. J. Marchand, and S. S. Changiz Rezaei, Systematic and deterministic graph minor embedding for Cartesian products of graphs, Quantum Information Processing 16, 1 (2017), ISSN 15700755, 1602.04274, arXiv:1602.04274 [cs.DM], pp. 1-22.
A. Perdomo-Ortiz, A. Feldman, A. Ozaeta, S. V. Isakov, Z. Zhu, B. O'Gorman, H. G. Katzgraber, A. Diedrich, H. Neven, J. de Kleer, et al., On the readiness of quantum optimization machines for industrial applications (2017), arXiv:1708.09780, pp. 1-22.
S. Kirkpatrick, C. D. Gelatt, Jr., and M. P. Vecchi, Optimization by simulated annealing, Science 220, p. 671-680 (1983).
F. Glover, Artificial evolution (Springer, 1997), vol. 1363 of Lecture Notes in Computer Science, chap. A Template for Scatter Search and Path Relinking, pp. 13-54.
M. G. C. Resende, C. C. Ribeiro, F. Glover, and R. Marti, Scatter search and path relinking: Fundamentals, advances and applications, Handbook of Metaheuristics: International Series in Operations Research Management Science 146, 37 (2010), pp. 1-22.
AWS Braket, Amazon braket python sdk: A python sdk for interacting with quantum devices on amazon braket, 2021 downloaded fro https://github.com/aws/amazon-braket-sdk-python on Dec. 30, 2022, pp. 1-9.
M. Quigley, K. Conley, B. P. Gerkey, J. Faust, T. Foote, J. Leibs, R. Wheeler, and A. Y. Ng, Ros: an open-source robot operating system, pp. 1-6, https://ros.org (last accessed: May 2022).
S. Karaman and E. Frazzoli, Sampling-based algorithms for optimal motion planning, The International Journal of Robotics Research 30 (2011), arXiv:1105.1186v1, pp. 1-76.
J. Bergstra, D. Yamins, and D. Cox, "Making a Science of Model Search: Hyperparameter Optimization in Hundreds of Dimensions for Vision Architectures," in Proceedings of the 30th International Conference on Machine Learning, edited by S. Dasgupta and D. McAllester (PMLR, Atlanta, Georgia, USA, 2013), vol. 28 of Proceedings of Machine Learning Research, pp. 115-123, URL https://proceedings.mlr.press/v28/bergstra13.html, pp. 1-9.
M. G. C. Resende and C. C. Ribeiro, "Greedy Randomized Adaptive Search Procedures: Advances, Hybridizations, and Applications," 2010, Kluwer Academic Publishers, Handbook of metaheuristics, pp. 219-249.
R. M. Aiex, M. Resende, and C. Ribeiro, Ttt plots: a perl program to create time-to-target plots, Optimization Letters 1, 355 (2007), pp. 1-11.

(56) References Cited

OTHER PUBLICATIONS

J. F. Gonçalves and M. G. C. Resende, Biased random-key genetic algorithms for combinatorial optimization, Journal of Heuristics 17, pp. 487-525 (2011), URL http://dx.doi.org/10.1007/s10732-010-9143-1.

* cited by examiner

RANDOM KEY OPTIMIZATION FOR GENERATING SEQUENCING PLANS

BACKGROUND

Optimization techniques offer solutions in many different technological areas. For example, combinatorial optimization is one area with many practical applications. Many different industries, in the private and public sectors, may use combinatorial optimization techniques to implement solutions in fields as diverse as transportation and logistics, telecommunications, and finance.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of random key optimization for sequencing plans are described herein. Sequencing plans may describe a sequence of movements and/or operations) which may be performed across a group of system components, devices, or agents in order to complete tasks. For instance, robotic movements in a large manufacturing facility may be coordinated according to a movement plan to avoid collisions and other disruptions as well as to perform manufacturing tasks efficiently. A motion plan may be a sequencing plan generated to perform the robotic movements in such a scenario. The complexity of developing sequencing plans given the large potential factors could exceed the computational capacities of computing systems to provide optimal solutions within a practical period of time for implementation. Therefore, techniques using random key optimization for generating sequencing plans may be implemented to provide a computational feasible technique, expanding the capabilities of computing systems to generate these sequencing plans for complex systems (e.g., manufacturing or distribution systems).

Figure 1:
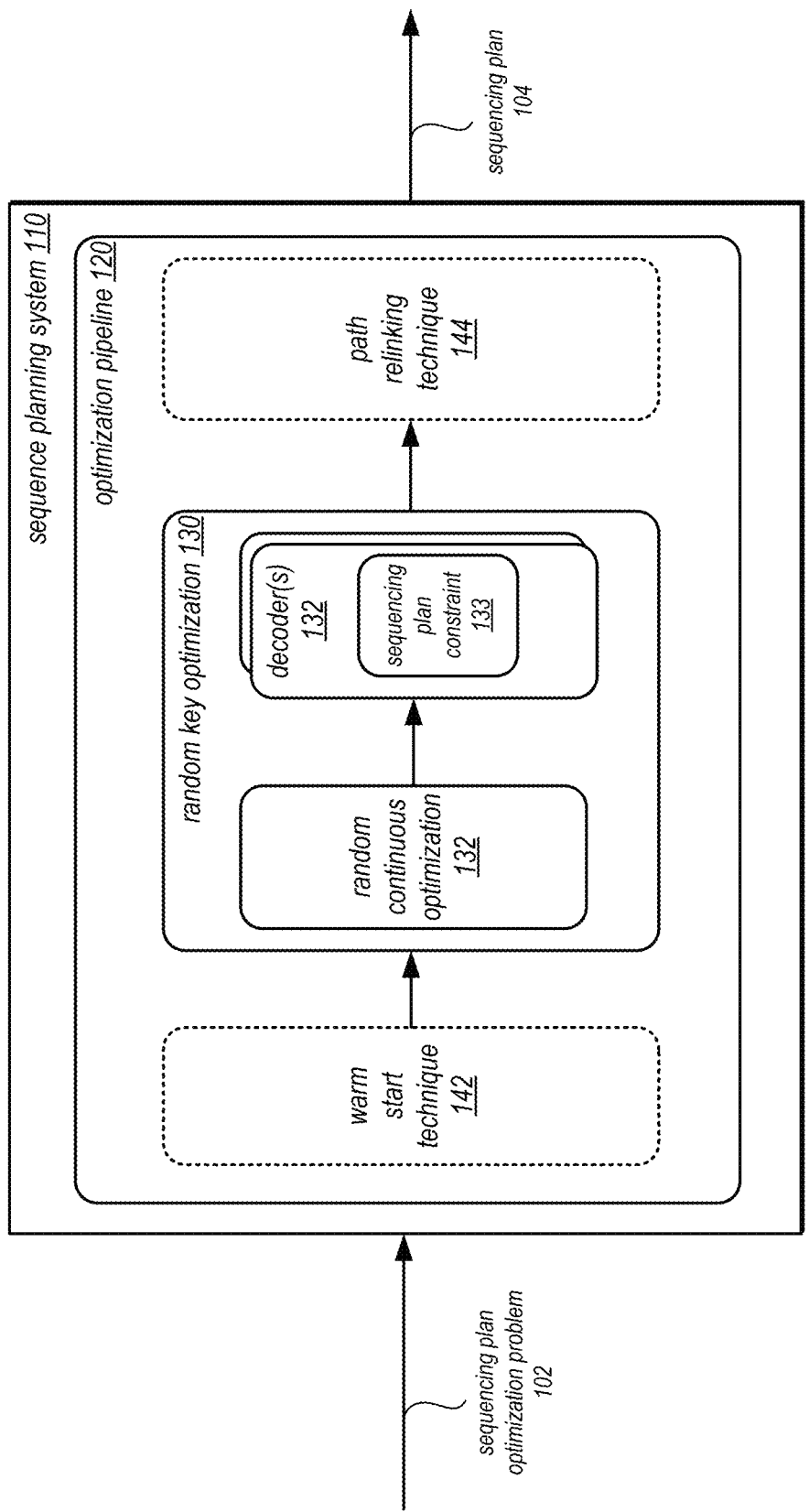
FIG. 1 illustrates a logical block diagram illustrating random key optimization for sequencing plans, according to some embodiments.

FIG. 1 illustrates a logical block diagram illustrating random key optimization for sequencing plans, according to some embodiments. Sequence planning system 110 may be a stand-alone system or service to accept sequencing plan generation requests and use random key optimization to provide a generated sequencing plan. In some embodiments, sequence planning system 110 may be implemented as part of a provider network service, such as optimization service 610 discussed below with regard to FIGS. 6-8.

Sequence planning system 110 may implement an optimization pipeline 120 which may include various stages, including random key optimization 130. As discussed in detail below, both with regard to the examples for robotic movement planning for FIGS. 2-5, and for service implementations in FIGS. 6-8, different stages may be included (in various combinations) in addition to random key optimization, such as a warm start technique 142 and a path relinking technique 144.

Random key optimization 130 may take a sequencing plan optimization problem 102 (e.g., described as a matrix of decision variables as discussed below with regard to Table 1 and FIG. 5) and formulate the variables as nodes representing the decision variables as nodes. These nodes may then be randomly and continuously searched in an iterative technique to determine a solution to an objective function for the sequencing plan optimization problem. As part of the iterative process, decoder 132 may be implemented to decode an output set of node values, as a vector, according to a sequencing plan constraint. For example, a sequencing plan constraint may be to visit each and every location in a sequence using the different components (e.g., robots) in a system for which the sequencing plan is generated. Once termination criteria are reached, random key optimization may be stopped and a decoded vector may be provided as a motion plan. A fitness score (e.g., cost function) may be determined at each iteration and may be provided, in some embodiments, with the final sequencing plan that is decoded from the finally determined vector.
}

Various different random continuous optimization techniques 132 may be used. For example, gradient free techniques (including the biased random-key genetic algorithm (BRKGA), simulated annealing, and dual annealing techniques discussed below with regard to FIGS. 2-5) as well as other examples such as Particle-swarm optimization, Beetle Antennae Search (BAS) Algorithm, Nelder-Mead method, Continuous GRASP, and Differential Evolution, can be used. However, in some embodiments, gradient-based techniques, including but not limited to (Stochastic) gradient descent, Coordinate descent, Frank-Wolfe algorithm, Broyden-Fletcher-Goldfarb-Shanno (BFGS) algorithm, Davidon-Fletcher-Powell (DFP) algorithm, and Sequential quadratic programming (SQP), can be used. In this way, the various different random continuous optimization techniques as well as additional stages, like warm start technique 142 and path relinking technique 144 (as discussed below) can be used to generate sequencing plans142 for a variety of sequencing plan optimization problems 102 across diverse scenarios.

For example, one example of sequence planning is robot motion planning. Robot motion planning is pervasive across many industry verticals, including (for example) automotive, manufacturing, and logistics. Specifically, in the automotive industry robotic path optimization problems can be found across the value chain in body shops, paint shops, assembly and logistics, among others. Typically, hundreds of robots operate in a single plant in body and paint shops alone. Paradigmatic examples in modern vehicle manufacturing involve so-called welding jobs, application of adhesives, sealing panel overlaps, or applying paint to the car body. The common goal is to achieve efficient load balancing between the robots, with optimal sequencing of individual robotic tasks within the cycle time of the larger production line.

Another prototypical example involves a post-welding processes by which every joint is sealed with special compounds to ensure a car body's water-tightness. To this end, polyvinyl chloride (PVC) is commonly applied in a fluid state, thereby sealing the area where different metal parts overlap. The strips of PVC are referred to as seams. Post application, the PVC is cured in an oven to provide the required mechanical properties during the vehicle's lifetime. Important vehicle characteristics such as corrosion protection and soundproofing are enhanced by this process. Modem plants usually deploy a fleet of robots to apply the PVC sealant, as schematically depicted in FIG. 2.

Figure 2:
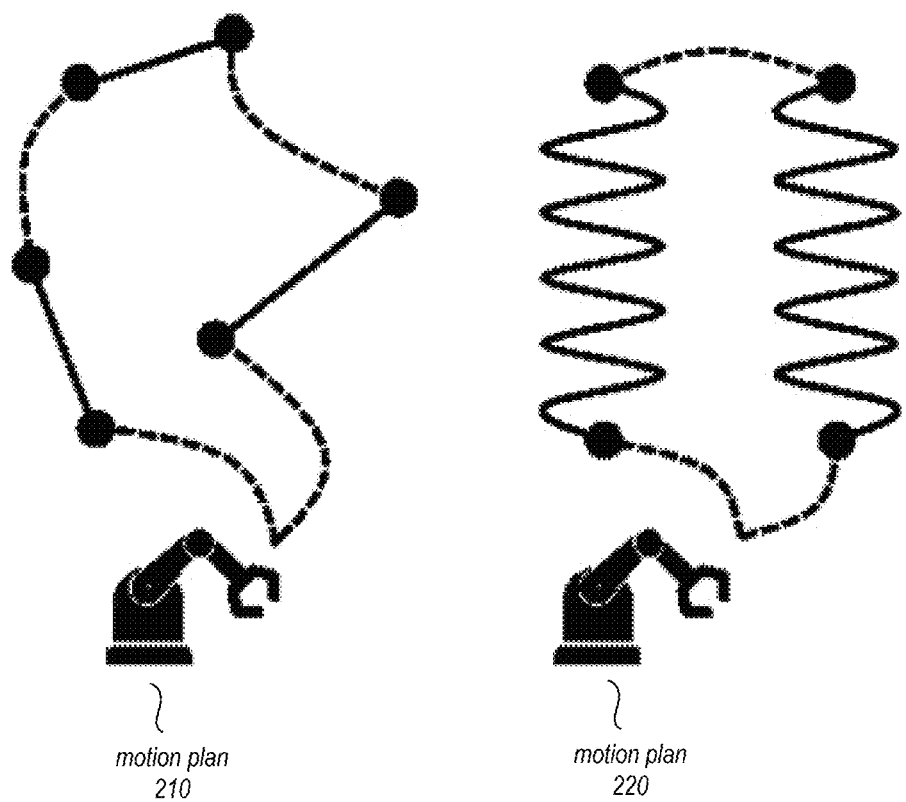
FIG. 2 illustrates two example motion plans for robots, according to some embodiments.

FIG. 2 illustrates two example motion plans for robots, according to some embodiments. In these illustrated examples for motion plans 210 and 220, robots are programmed to follow certain trajectories along which they apply a PVC sealant along seams. The seams are highlighted by solid lines with two endpoints each, and are not necessarily straight. Dotted lines represent additional motion between seams. Every robot is equipped with multiple tools and tool configurations, to be chosen for every seam. The goal is to identify collision-free trajectories such that all seams get processed within the minimum time span.

However, the major part of robot programming is typically carried out by hand, either online or offline. Compared to the famous NP-hard traveling salesman problem, the complexity of identifying optimal robot trajectories is amplified by three major factors. First, an industrial robot arm can have multiple configurations that result in the same location and orientation of the end effector. Furthermore, the PVC is applied with a tool that is equipped with multiple nozzles that allows for application at different angles. A choice must be made regarding which nozzle to use for seams that display easy reachability. Finally, industrial robots are frequently mounted on a linear axis; thus, an optimal location of the robot on the linear axis at which the seam is processed must be determined. The objective of picking and sequencing the robot's trajectories is to find a time-optimal and collision-free production plan. Such an optimal production plan may increase throughput, and automation of robot programming reduces the development time of new car bodies.

Moreover, quantum computers hold the promise to solve seemingly intractable problems across virtually all disciplines with chemistry and optimization being likely the first medium-term workloads. Specifically, the advent of quantum annealing devices such as the D-Wave Systems Inc. quantum annealers have increased interest in the development of quantum-native, heuristic approaches to solve discrete optimization problems. While impressive progress has been made over the last few years, the field is currently still in its infancy, but arguably at a transition point from mere academic research to industrialization. Currently, however, it is still unclear what type of quantum hardware and algorithms will deliver quantum advantage for a practical, real-world problem. Because of this, it is imperative to develop optimization methods, such as for generating motion plans, that can bridge the gap until scalable quantum hardware is available, but also prepare to use specific optimization models that will eventually be able to run on quantum hardware.

In various embodiments, the random key optimization techniques for generating sequencing plans can thus be used to generate solutions to optimization problems that provide sequencing plans for the above example as well as many other use cases. Because the optimization pipelines determined through these techniques can execute on both classical computing hardware and quantum computing hardware, their wide-ranging applicability can increase the number of applications that can integrate sequencing plans generated using these techniques, which in turn increases the performance of these applications.

On example of a random key optimization technique may be a biased random-key genetic algorithm (BRKGA). As noted above, in some embodiments other techniques that are gradient-free or gradient based can be used. Thus the following description is merely one example embodiment of a random key optimization technique. BRKGA represent a (nature-inspired, because genetic) heuristic framework for solving optimization problems. BRKGA may also be applied to continuous optimization problems. The BRKGA formalism is based on the idea that a solution to an optimization problem can be encoded as a vector of random keys, e.g., a vector X in which each entry is a real number, generated at random in the interval (0, 1]. Such a vector X is mapped to a feasible solution of the optimization problem with the help of a decoder, e.g., a deterministic algorithm that takes as input a vector of random keys and returns a feasible solution to the optimization, as well as the cost of the solution.

The BRKGA framework is well suited for sequencing-type optimization problems, as relevant for the example PVC use case. For example, consider the traveling salesman problem (TSP) where a salesman is required to visit n given cities, each city only once, and do so taking a minimum-length tour. A solution to the TSP is a permutation $\pi$ of the n cities visited and its cost is $$c=l(\pi_1,\pi_2)+l(\pi_2,\pi_3)+ \ldots +l(\pi_{n-1},\pi_n)+l(\pi_n,\pi_1)$$

where $l(i, j)$ is the distance between city i and city j. A possible decoder for the TSP takes the vector of random keys as input and sorts the vector in increasing order of its keys. The indices of the sorted vector make up $\pi$, the permutation of the visited cities. As an example consider a TSP on five cities and let $X=(0.45, 0.78, 0.15, 0.33, 0.95)$. The sorted vector is $s(X)=(0.15, 0.33, 0.45, 0.78.0.95)$ and its vector of indices is $\pi=(3, 4, 1, 2, 5)$ having cost $$c=l(3,4)+l(4,1)+l(1,2)+l(2,5)+l(5,3)$$

Consider now the vehicle routing problem (VRP) where it may be given up to p vehicles, a depot (node 0) and n locations $\{1, 2, \ldots, n\}$ that these vehicles must visit, starting and ending at the depot. Each location must be visited by exactly one vehicle and all locations must be visited. A solution to this problem is a set of p permutations $\pi 1, \pi 2, \ldots, \pi p$ such the $\pi i \cap \pi j=\emptyset$ (i.e., no two vehicles visit the same location), for $i=1, \ldots, p-1, j=i+1, \ldots, p$ and $\cup_{i=1}^{p}=\pi^{i}=1, 2, \ldots, n\}$ (e.g., all locations are visited). In this solution $\pi^i$ indicates the sequence that vehicle i will take. Suppose $\pi^1=\{1, 3, 5\}$ and $\pi^2=\{4, 2\}$, then vehicle 1 visits locations 1, 3, and 5, in this order, and vehicle 2 visits location 4 and then location 2. Both vehicles start and end their tours at node 0 (the depot). The cost C of this solution is the sum of the costs of the tours of each vehicle, i.e. $C=c^1+c^2$, where $$c^1=l(0,1)+l(1,3)+l(3,5)+l(5,0)$$

and $$c^2=l(0,4)+l(4,2)+l(2,0)$$

A possible decoder for the VRP takes as input a vector of n+v random keys, sorts the keys in increasing order of their values, rotates the vector of sorted keys such that the largest of the v keys is last in the array, and then uses the v keys to indicate the division of locations traveled to by each vehicle. For example, consider n=5 and v=2 and consider the following vector $X=(0.45, 0.78, 0.15, 0.33, 0.95, 0.25, 0.35)$ of random keys. The first n=5 keys correspond to the locations to be visited by the v=2 vehicles. The last two keys correspond to the two vehicles and are indicated in bold. Sorting the keys in increasing order results in $s(X)=(0.15, 0.25, 0.33, 0.35, 0.45, 0.78, 0.95)$. The corresponding solution (3,V1, 4,V2, 1, 2, 5) corresponds to the indices of the sorted random-key vector. For example, 3 is the index of the smallest key, 0.15, while 5 is the index of the largest key, 0.95. V1 and V2 correspond, respectively, to the indices of vehicle random keys in the sorted vector. Rotating the elements of the solution vector circularly such that V2 occupies the last position in the vector, (1, 2, 5, 3,V1, 4,V2) is obtained which translates into a solution where vehicle V1 leaves the depot and visits locations 1, 2, 5, 3, and then returns to the depot and vehicle V2 leaves the depot, visits location 4 and returns to the depot. The cost C of this solution is the sum of the costs of the tours of each vehicle, e.g., $C=c1+c2$, where $$c^1=\ell(0,1)+\ell(1,2)+\ell(2,5)+\ell(3,0)$$

and $$c^2=\ell(0,4)+\ell(4,0)$$

BRKGA starts with an initial population $P_0$ of p random-key vectors, each of length N. A decoder is applied to each vector to produce a solution to the problem being solved. Over a number of generations, BRKGA evolves this population until some stopping criterion is satisfied. Populations $P_1, P_2, \ldots, P_K$ are generated over K generations. The best solution in the final population is output as the solution of the BRKGA. BRKGA is an elitist algorithm in the sense that it maintains an elite set E with the best solutions found during the search. The dynamics of the evolutionary process is simple. The population $P_k$ of each generation is made up of two sets of random vectors, the elite set and the remaining solutions, the nonelite set. To generate population $P_{k+1}$ from $P_k$ the elite set of $P_k$ is copied, without modification to $P_{k+1}$. This accounts for $p_e=|E|$ elements. Next, a set M of mutant solutions (randomly generated random-key vectors) is generated and added to $P_{k+1}$. This accounts for an additional $p_m=|M|$ elements. The remaining $p-p_e-p_m$ elements of $P_{k+1}$ are generated through parameterized uniform crossover. Two parents are selected at random, with replacement, one from the elite set of $P_k$, the other from the nonelite set. Denote these parents, respectively, as the elite parent $X_a$ and the nonelite parent $X_b$. The offspring $X_c$ is generated as follows. For $i=1, \ldots, N$, let $X_c[i] \leftarrow X_a[i]$ with probability $\Pi>\frac{1}{2}$. Else, with probability $1-\Pi$, $X_c[i] \leftarrow X_b[i]$. Offspring $X_c$ is added to $P_{k+1}$. This process is repeated until all $p-p_e-p_m$ offsprings are added to $P_{k+1}$, completing a population of p elements. The $p_e$ random-key vectors with the overall best solutions of $P_{k+1}$ are placed in the population's elite set, while the remaining vectors are nonelite solutions. A new iteration starts by setting $k \leftarrow k+1$.

Figure 3:
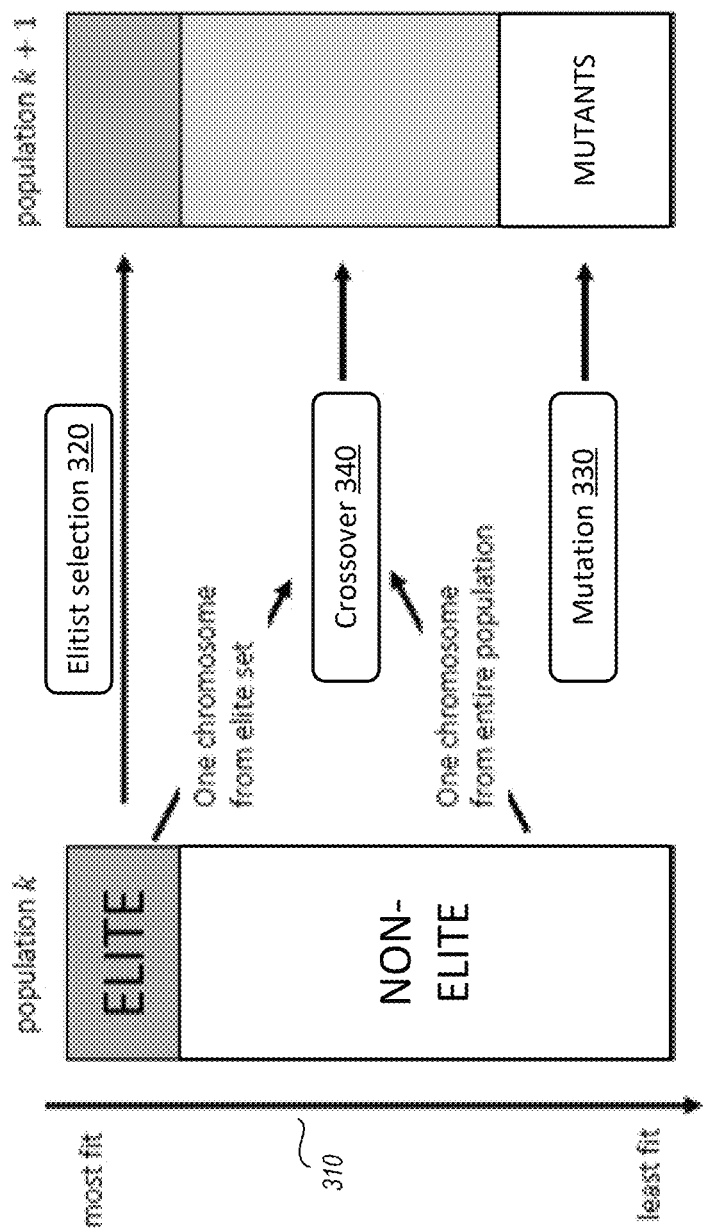
FIG. 3 illustrates a logical block diagram of biased random-key genetic algorithm (BRKGA) used for random key optimization, according to some embodiments.

FIG. 3 illustrates a logical block diagram of BRKGA used for random key optimization, according to some embodiments. As indicated at 310, the chromosomes within the current population k are ranked according to their fitness values. As indicated at 320, the elite individuals (those with the highest fitness scores) are copied over to population k+1. As indicated at 330, for diversity and to combat local minima, new mutant individuals are randomly generated and added to the population k+1. As indicated at 340, the remaining portion of the population k+1 is topped up with offsprings generated by a biased crossover that mates elite with nonelite parents.

BRKGA is a general-purpose optimizer where only the decoder needs to be tailored towards a particular problem. In addition, several hyperparameters need to be specified. These are limited to the length N of the vector of random-keys, the size p of the population, the size of the elite set $p_e<p/2$, the size of the set of mutants $p_m \leq p-p_e$, and the probability $\Pi>\frac{1}{2}$ that the offspring inherits the keys of the elite parent. In addition, a stopping criterion needs to be given. That can be, for example, a maximum number of generations, a maximum number of generations without improvement, a maximum running time, or some other criterion. Application programming interfaces (API) may be used for BRKGA (or other random key optimization techniques) that allow for the decoder to be defined and specify the hyperparameters of the algorithm.

In some embodiments, decoding can be done in parallel. Instead of evolving a single population, several populations can be evolved in an island model. Restarts may improve the performance of stochastic local search optimization algorithms. The number of generations without improvement can be used to trigger a restart in a BRKGA where the current population is replaced by a population of p vectors of random keys. In BRKGA with restart a maximum number of restarts can be used as a stopping criterion. Instead of mating two parents, mating can be done with multiple parents. Finally, path re-linking strategies can be applied in the space of random keys as a problem independent intensification operator, in some embodiments.

Next, discussion of dual annealing (DA) may provide further explanations as to how various embodiments may be extensible to execution on quantum hardware. DA is a stochastic, global (nature-inspired) optimization algorithm. The following is a description of DA which may be used as the random key optimization technique. DA may be based on Generalized Simulated Annealing (GSA), which generalizes classical simulated annealing (CSA) and the extended fast simulated annealing (FSA) into one unified algorithm, coupled with a strategy for applying a local search on accepted locations for further solution refinement. GSA uses a modified Cauchy-Lorentz visiting distribution, whose shape is controlled by the visiting parameter $q_v$ $$g_{q_v}(\Delta X(t)) \propto \frac{[T_{q_v}(t)]^{\frac{-D}{3-q_v}}}{\left[1 + (q_v - 1)\frac{(\Delta X(t))^2}{[T_{q_v}(t)]^{\frac{2}{3-q_v}}}\right]^{\frac{1}{q_v-1}+\frac{D-1}{2}}} \quad (1)$$

where t is the artificial time (algorithm iteration). This distribution is used to generate a candidate jump distance $\Delta X(t)$ under temperature $T_{q_v}$, which is the step from variable $X(t)$ the algorithm proposes to take. If this proposed step yields an improved cost, it is accepted. If the step does not improve the cost, it may be accepted with acceptance probability $p_{q_a}$ $$p_{q_a} = \min\left\{1, \max\left\{0, [1 - (1-q_a)\beta\Delta E]^{\frac{1}{1-q_a}}\right\}\right\} \quad (2)$$

where $\Delta E$ is the change in energy (cost) of the system, qa is an algorithm hyperparameter, and $\beta \equiv 1/(\kappa T_{q_v}(t))$ refers to the inverse temperature, with Boltzmann constant $\kappa$. If the proposed step is accepted, this yields an update step of $$X(t)=X(t-1)+\Delta X(t) \quad (3)$$

otherwise, $X(t)$ remains unchanged. The artificial temperature $T_{q_v}(t)$ is decreased according to the annealing schedule $$T_{q_v}(t) = T_{q_v}(1)\frac{2^{q_v-1}-1}{(1+t)^{q_v-1}-1} \quad (4)$$

where $T_{q_v}(1)$ is the starting temperature, with default $T_{q_v}(1)=5230$. As the algorithm runs through this parameterized annealing schedule, both acceptance probabilities $P_{q_a}$ as well as jump distances $\Delta X(t)$ decrease over time; this has been shown to yield improved global convergence rates over FSA and CSA.

After each GSA temperature step, a local search function is invoked, which in the bounded variable case (e.g., $X(t) \in [0, 1]n$) defaults to the L-BFGS-B algorithm. At each iteration, the L-BGFS-B algorithm runs a line search along the direction of steepest gradient descent around $X(t)$ while conforming to provided bounds. Once the local search converges (or exits, for example, by reaching invocation limits), the found solution $X(t)$ is used as the starting point for the next step in the GSA algorithm.

This dual annealing process of GSA followed by L-BGFS-B runs until convergence, or until the algorithm exits due to maximum iterations, as set by the algorithm's hyperparameter maxiter. If the artificial temperature $T_{q_v}(t)$ shrinks to a value smaller than $R^*T_{q_v}(1)$ (with corresponding hyperparameter restart_temp_ratio), then the dual annealing process is restarted, with temperature reset to $T_{q_v}(1)$ and a random (bounded) position is provided for $X_0$. Note that the algorithm iteration counts are not reset in this case, so overall algorithm runtime remains tractable.

Quantum computers are devices that harness quantum phenomena not available to conventional (classical) computers. Two example paradigms for quantum computing involve (universal) circuit-based quantum computers, and (special-purpose) quantum annealers. While the former hold the promise of exponential speed-ups for certain problems, in practice circuit-based devices are extremely challenging to scale up, with current quantum processing units (QPUs) providing about one hundred (physical) qubits. Moreover, to fully unlock any exponential speed-up, perfect (logical) qubits have to be realized, as can be done using quantum error correction, albeit with a large overhead, when encoding one logical (noise-free) qubit in many physical (noisy) qubits. Conversely, quantum annealers are special-purpose machines designed to solve certain combinatorial optimization problems belonging to the class of Quadratic Unconstrained Optimization (QUBO) problems. Since quantum annealers do not have to meet the strict engineering requirements that universal gate-based machines have to meet, already today this technology features ~5000 (physical) analog superconducting qubits.

Recently, the QUBO framework has emerged as a powerful approach that provides a common modelling framework for a rich variety of NP-hard combinatorial optimization problems, albeit with the potential for a large variable overhead for some use cases. Prominent examples include the maximum cut problem, the maximum independent set problem, the minimum vertex cover problem, and the traveling salesman problem, among others. The cost function for a QUBO problem can be expressed in compact form with the Hamiltonian $$H_{QUBO}=x^T Q x = \Sigma_{i,j} x_i Q_{ij} x_j \quad (5)$$

where $x=(x_1, x_2, \ldots)$ is a vector of binary decision variables and the QUBO matrix Q is a square matrix that encodes the actual problem to solve. Without loss of generality, the Q-matrix can be assumed to be symmetric or in upper triangular form. In this example, any irrelevant constant terms are omitted, as well as any linear terms, as these can always be absorbed into the Qmatrix because $x_i^2 = x_i$ for binary variables $x_i \in \{0, 1\}$. Problem constraints—which relevant for many real-world optimization problems—can be accounted for with the help of penalty terms entering the objective function. Further examples will be provided below.

The significance of QUBO formalism is further illustrated by the close relation to the Ising model, which is known to provide mathematical formulations for many NP-complete and NP-hard problems. As opposed to QUBO problems, Ising problems are described in terms of binary (classical) spin variables $z_i \in \{-1, 1\}$, that can be mapped straightforwardly to their equivalent QUBO form, and vice versa, using $z_i = 2x_i - 1$. The corresponding classical Ising Hamiltonian reads $$H_{Ising} = -\Sigma_{i,j} J_{ij} z_i z_j - \Sigma_i h_i z_i \quad (6)$$

with two-body spin-spin interactions $J_{ij} = -Q_{ij}/4$, and local fields hi (note that a trivial constant has been omitted). If the couplers $J_{ij}$ are chosen from a random distribution, the Ising model given above is also known as a spin glass. By definition, both the QUBO and the Ising models are quadratic in the corresponding decision variables. If the original optimization problem involves k-local interactions with k>2, degree reduction schemes have to be involved, at the expense of the aforementioned overhead in terms of the number of variables. In general, one disadvantage of solving problems in a QUBO formalism on quantum annealing hardware lies in the fact that the problem has to be first mapped to a binary representation, then locality has to be reduced to k≤2.

Quantum annealing (QA) is a metaheuristic for solving combinatorial optimization problems on special purpose quantum hardware, as well as via software implementations on classical hardware using quantum Monte Carlo. In this approach the solution to the original optimization problem is encoded in the ground state of the so-called problem Hamiltonian $\hat{H}_{problem}$. Finding the optimal assignment $z^*$ for the classical Ising model (6) is equivalent to finding the ground state of the corresponding problem Hamiltonian, where the classical spins $\{z_i\}$ are promoted to quantum spin operators $\{\hat{\sigma}_i^z\}$, also known as Pauli matrices, thus describing a collection of interacting qubits. To (approximately) find the classical solution $\{z_i^*\}$, quantum annealing devices then undergo the following protocol: Start with the algorithm by initializing the system in some easy-to-prepare ground state of an initial Hamiltonian $\hat{H}_{easy}$, which is chosen to not commute with $\hat{H}$ problem. Following the adiabatic approximation, the system is then slowly annealed towards the so-called problem Hamiltonian $\hat{H}_{problem}$, whose ground state encodes the (hard-to-prepare) solution of the original optimization problem. This is commonly done in terms of the annealing parameter τ, defined as $\tau = t/T_A \in [0, 1]$, where t is the physical wall-clock time, and $T_A$ is the annealing time. In the course of this anneal, ideally, the probability to find a given classical configuration converges to a distribution that is strongly peaked around the ground state of $H_{Ising}$. Overall, the protocol is captured by the time-dependent Hamiltonian $$\hat{H}(\tau) = A(\tau)\hat{H}_{easy} + B(\tau)\hat{H}_{problem} \quad (7)$$

where the functions A(τ),B(τ) describe the annealing schedule, with A(0)/B(0)>>1, and A(1)/B(1)<<1. For example, a simple, linear annealing schedule is given by A(τ)=1-τ, and B(τ)=τ. Because of manufacturing constraints, current experimental devices can only account for 2-local interactions, with a cost function described by $$\hat{H}_{problem} = -\Sigma_{i,j} J_{ij} \hat{\sigma}_i^z \hat{\sigma}_j^z - \Sigma_i h_i \hat{\sigma}_i^z \quad (8)$$

while the initial Hamiltonian is typically chosen as $$\hat{H}_{easy} = -\Sigma_i \hat{\sigma}_i^x \quad (9)$$

that is a transverse-field driving Hamiltonian responsible for quantum tunneling between the classical states making up the computational basis states. Because the final Hamiltonian (8) only involves commuting operators $\{\hat{\sigma}_i^z\}$, the final solution $\{z_i^*\}$, can be read out as the state of the individual qubits via a measurement in the computational basis.

Solving an optimization problem of QUBO form on QA hardware, however, frequently involves one more step, typically referred to as embedding. Because of manufacturing constraints, quantum annealers based on superconducting technology may only come with limited connectivity, e.g., not every qubit is physically connected to every other qubit. In fact, typically the on-chip matrix $J_{ij}$ is sparse. If, however, the problem's required logical connectivity does not match that of the underlying hardware, one can effectively replicate the former using an embedding strategy by which several physical qubits are combined into one logical qubit. The standard approach to do so is called minor embedding which provides a mapping from a (logical) graph to a sub-graph of another (hardware) graph. One can then solve high-connectivity problems directly on the sparsely connected chip, by sacrificing physical qubits accordingly to the connectivity of problem, typically introducing a considerable overhead with multiple physical qubits making up one logical variable. This limitation makes the problems subsequently harder to solve than in their native formulation. Specifically, in the extreme case of a fully-connected graph (as relevant for traveling salesman problem) only approximately ~64 logical spin variables can be embedded within the D-Wave 2000 Q quantum annealer that nominally features ~2000 physical qubits. Finally, when including constrained problems, the coupler distributions tend to broaden, which, in turn, results in an additional disadvantage due to the limited precision of the analog device.

Figure 4:
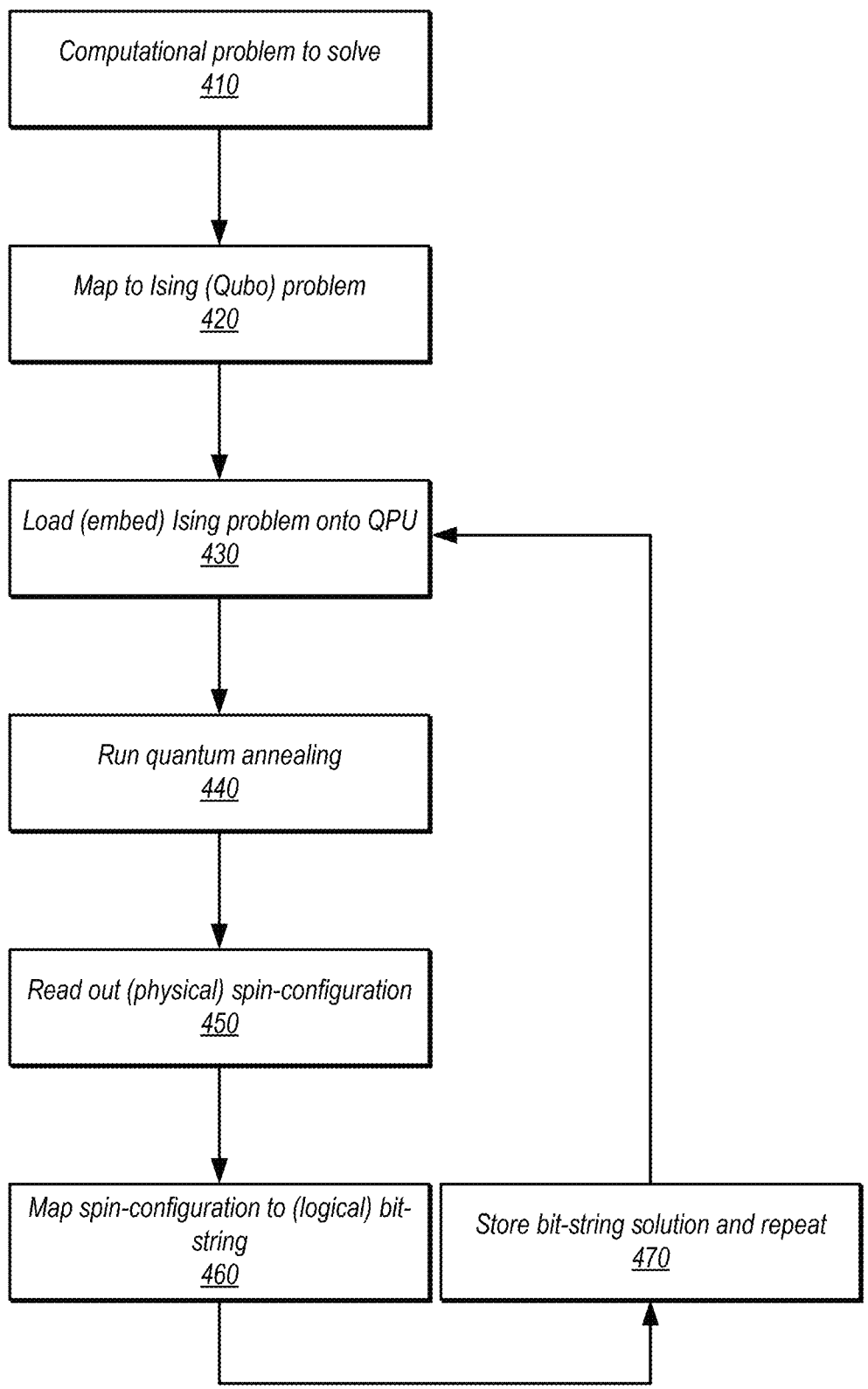
FIG. 4 illustrates a logical block diagram of a workflow for solving combinatorial optimization problems on a quantum annealer, according to some embodiments.

Quantum annealing devices, such as devices provided by DWave Systems Inc. can be conveniently accessed through the cloud, such as a computational resource discussed below with regard to optimization service 610 in provider network 600. FIG. 4 illustrates a logical block diagram of a workflow for solving combinatorial optimization problems on a quantum annealer, according to some embodiments. As indicated at 420, the problem 410 has to be cast as a QUBO (or equivalently Ising) Hamiltonian. This abstract QUBO problem is then mapped onto the physical QPU, as indicated at 430 typically at the expense of an enlarged number of variables (given the sparse connectivity of the underlying quantum chip). Next, quantum annealing is used to find a high-quality variable configuration, as indicated at 440. This solution is read out 450 and mapped back to a bit-string (of logical variables) corresponding to a solution of the original optimization problem, as indicated at 460. Given the probabilistic nature of this process, it is typically repeated multiple times, as indicated at 470, followed by a statistical analysis. The goal is to find a configuration of variables that (approximately) minimizes the objective function.

A composite node can be viewed as a generalization of a city in the canonical TSP. In analogy of the TSP, the goal is to identify an optimal sequence of nodes, with a node encoding not only spatial information, but also other categorical features relevant to the use case at hand. Specifically, in the working example discussed below, a node may be a quintuple of the form $$\text{node} = [s, d, t, c, p] \quad (10)$$

Generalizations to other problems are straightforward. Here, a node encapsulates information about the seam index $s = 1, \ldots, n_{seams}$, the direction d=0, 1 by which a given seam is sealed, the tool $t = 1, \ldots, n_{tools}$ and tool configuration $c = 1, \ldots, n_{config}$ used, as well as the (discretized) linear-axis position $p = 1, \ldots, n_{position}$. This definition of a generalized, composite node accounts for the fact that (i) any seam can be sealed in one of two directions, (ii) a robot can seal a given seam using one of several tools, (iii) which (at the same time) can be employed in different configurations, and (iv) a robot can take one of several positions along a fixed rail. All coordinates can be described by integer values. The problem is then specified in terms of cost values $w_{node_i}^{node_j}$ (in seconds) for the robot to move from one of the endpoints of $node_i$ to one of the endpoints of $node_j$, including both the cost associated with applying PVC to $node_i$ as well as proceeding in idle mode to $node_j$. As illustrated in FIG. 2, every seam has two endpoints, i.e., a degree of freedom captured by the binary direction variable d=0, 1. For illustration, a sample data set is shown in Table 1.

TABLE 1

| node (from) | | | | | node (to) | | | | | cost |
|---|---|---|---|---|---|---|---|---|---|---|
| s | d | t | c | p | s | d | t | c | p | w[s] |
| 0 | 0 | 0 | 0 | 0 | 18 | 1 | 1 | 1 | 1 | 0.877 |
| 11 | 2 | 1 | 0 | 1 | 12 | 1 | 2 | 0 | 1 | 0.473 |
| 11 | 2 | 1 | 0 | 1 | 12 | 0 | 3 | 0 | 0 | 0.541 |
| 32 | 2 | 1 | 2 | 1 | 25 | 2 | 1 | 2 | 1 | 0.558 |
| . | | | | | . | | | | | . |
| . | | | | | . | | | | | . |
| . | | | | | . | | | | | . |

Example data set (cost matrix) for illustration in Table 1. The problem is specified in terms of cost values (in seconds) for pairs of nodes, with every node described by a tuple [s, d, t, c, p] that captures the seam index s, direction d, tool t, tool configuration c, and robot position p.

For industry-relevant problem instances such a data set has roughly one million rows, only providing preselected, feasible connections, as (in practice) many node pairs represent infeasible robot routes because of obstacles. Finally, each robot may have a home (or base) position from which it starts its operation, and where its tour comes to an end; this home position is associated with the node [0, 0, 0, 0, 0].

The following discussion provides an example of a decoder for random key optimization techniques. The problem input is given in terms of a generalized cost matrix as displayed in Table 1. Similar to the TSP, the goal may be to identify a minimum-cost tour (as a sequence of nodes) that visits n given seams, each seam only once, while specifying the additional degrees of freedom making up a composite node. While the problem encoding is specified by the evolutionary part underlying BRKGA, decoding is controlled through the design of the decoder. Here, the decoder is designed as follows according to the example pseudo code:

```
def decode_piecewi se (s e l f, chromosome):
    #Split chromosome into (N) dimensions, to be decoded
       independently
    chr_pieces=np.array_spl i t (chromosome, self.instan-
       ce.num_dims)
 decoded_pieces=[ ]
 sort_order=None
 for idx, piece in enumerate(chr_pieces)
    if idx==0: #assume dim0=abstract node number (e.g.
       seam number)
       #Sort in ascending order and use the order of indices
       permutation=np.argsort (piece)
       #Track seam order to pair correctly with other
          dimensions
       sort_order=copy (permutation)
    else:
       #Assume categorical values for all other dimensions
       n_bins=self.instance.dim_sizes [idx]
       step_size=1./n_bins
       #Define bin edges
       bins=np. arange (0. 0, 1.0+step_size, step=step_size)
       #Assign values to bins, report bin assignment; offset
          by 1
       permutation=np.digitize (piece, bins)−1
       #Rearrange output according to seam argsort order
       permutation=permutation [sort_order]
       decoded_pieces.append (permutation)
    #Pair elements in same position across dimensions
    #i.e. [1, 2, 3], [1 0, 2 0, 3 0]→[1, 1 0], [2, 2 0], [3, 3
       0]
 decoded=list (zip (*decoded_pieces))
 return decoded
def decode (self, chromosome, rewrite: bool=False)→
    float:
    #Decode chromosome into tour, with nodes o f N-di-
       mensions
    decoded=self.decode_piecewise (chromosome)
    #Add distance from LAST node to FIRST node
    cost=self.ins tance.distance (decoded [−1], decoded
       [0])
    #Cumulative sum of distances for intermediate nodes
       of tour
    for i in range (len (decoded)−1):
       cost+=self.instance.distance (decoded [i], decoded
          [i+1])
    return cost
```

The decoder takes a vector X of N=D·$n_{seams}$ random keys as input, sorts the keys associated with the seam numbers s in increasing order of their values, and applies simple thresholding logic to the remainder of keys. In this example case, the number of features D is D=5. Similar to the TSP example outlined above, the indices of the sorted vector component make up π, the permutation of the visited seams. As opposed to the TSP, however, discrete values may have to be assigned for the remaining node degrees of freedom as well. For example, if the corresponding original variable is binary, the thresholding logic reduces to int($X_i$)∈ {0, 1} but generalizations to variables with larger cardinality are straightforward. For example, if a larger cardinality is assumed for the original variable $Y_i$, say $Y_i$∈{1, 2, ... ,C}, then $Y_i$=k if Xi∈

$$\left(\frac{k-1}{C}, \frac{k}{C}\right)$$

for k=1, 2, ... , C. Note that the mathematical representation by design generates feasible routes only where every seam is visited exactly once, while only scaling linearly with the number of seams~nseams, and with a prefactor set by the number of degrees of freedom. While the original cost matrix as displayed in Table 1 features feasible connections only, the decoder may suggest infeasible moves that have been preselected from the original data set. By padding the cost matrix with prohibitively large cost values for these types of moves, over the course of the evolution the algorithm will learn to steer away from these bad-fitness solutions.

In the common BRKGA framework the trajectory of every chromosome X in the abstract half-open hypercube of dimension (0, 1]n is governed by evolutionary principles. However, alternative algorithmic paradigms such as simulated annealing (SA) and related methods can be readily used as well, all within random-key formalism. That is because for any chromosome X the decoder does not only provide the decoded solution s(X) but also the fitness (or cost) value f(X), in this case defined as the total cost of the tour. Black-box query access to f(X), however, is sufficient for optimization routines such as SA to perform an update on the solution candidate X and continue with training till some (algorithm-specific) stopping criterion is fulfilled.

The core optimization routine outlined above can be extended with additional upstream logic. Specifically, in analogy to model-stacking techniques commonly used in machine-learning pipelines, solutions provided by alternative algorithms, warm start techniques such as linear programming, greedy algorithms, quantum annealing, and so on can be used to warm-start initial values (e.g., an initial population) for the RKO, as opposed to coldstarts with a random initial population $P_0$. Similar to standard ensemble techniques, the output of several optimizers may be used to seed the input for RKO, thereby leveraging information learned by these while injecting diverse quality into the initial solution pool $P_0$. By design this strategy can only improve upon the solutions already found, as elite solutions are not dismissed and just propagate from one population to the next in the course of the evolutionary process. A challenge may be to invert the decoder with its inherent many-to-one mapping. To this end, a randomized heuristic may be used in some embodiments.

Consider a given permutation $\pi$ such as $\pi=(4, 2, 3, 1)$, with n=4. The goal may be then to design an algorithm which produces a random key X that (when passed to the decoder) is decoded to the permutation $\pi$. The interval (0, 1] may be divided into evenly spaced chunks of size $\Delta=1/n=0.25$, with centers $^-$Xi at 0.125, 0.375, 0.625, and 0.875. The input sequence $\pi$ may be looped through and assign these center values to appropriate positions in X, as X=(•, •, •, •)→(•, •, •, 0.125)→(•, 0.375, •, 0.125)→ . . . → (0.875, 0.375, 0.625, 0.125). When sorting this key, the desired sequence of indices may be obtained given by $\pi=(4, 2, 3, 1)$. This deterministic may be randomized by adding uniform noise $\delta i \in (^-Xi-\Delta/2, ^-Xi+\Delta/2)$ to each element in X, thus providing a randomized chromosome such as X=(0.93, 0.31, 0.67, 0.08). By repeating the last step m times, one can generate a pool of m warm chromosomes. For the remaining categorical features d, t, c, p it is straightforward to design a similar randomized protocol. For example, for the binary feature d, a random number may be generated in (0, 0.5] if d=0, and a random number in (0.5, 1] if d=1.

An optimization pipeline can be further refined with path relinking (PR) strategies for potential solution refinement. Several PR strategies are known, some of them operating in the space of random keys (also known as implicit PR) for problem-independent intensification, and some of them operating in the decoded solution space. The common theme underlying all PR approaches is to search for high-quality solutions in a space spanned by a given pool of elite solutions, by exploring trajectories connecting elite solutions; one or more paths in the search space graph connecting these solutions are explored in the search for better solutions. In addition to these existing approaches, a physics-inspired PR strategy can be applied post-training. Consider two high-quality chromosomes labelled as X1 and X2, respectively. A search for better solutions may be heuristically performed with the hybrid (superposition) Ansatz $$x(\alpha)=(1-\alpha)X_1+\alpha X_2 \quad (11)$$

with $\alpha \in [0, 1]$. Then scan the parameter a and query the corresponding fitness by invoking the decoder (without having to run the RKO routine again). For $\alpha=0$ and $\alpha=1$ recover the existing chromosomes $X_1$ and $X_2$, respectively, but better solutions may be found along the trajectory sampled with the hybridization parameter $\alpha$.

In various embodiments, restart strategies can be integrated into the optimization pipeline.

Next, is further discussion of the implementation of random key optimization techniques for generating a motion plan for the robot motion planning use case discussed above. Binary (one-hot encoded) variables may be introduced, setting x[$\tau$] node=1 if visit node=[s, d, t, c, p] at position $\tau=1, \ldots$, nseams of the tour, and x[$\tau$] node=0 otherwise. Following the QUBO formulation for the canonical TSP problem, the goal of finding a minimal-time tour may be described with the quadratic Hamiltonian $$H_{cost} = \sum_{\tau=1}^{n_{seams}} \sum_{node} \sum_{node'} w_{node}^{node'} x_{node}^{[\tau]} x_{node'}^{[\tau+1]} \quad (12)$$

with wnode' node denoting the cost to go from node to node'. Here, the product x[$\tau$] nodex[$\tau+1$] node'=1, if and only if node is at position $\tau$ in the cycle and node' is visited right after at position $\tau+1$. In that case, add the corresponding distance wnode' node to the objective function which to minimize. Overall, sum all costs of the distances between successive nodes. Next, enforce the validity of the solution through additional penalty terms, in order to account for the following constraints: First, have exactly one node assigned to every time step in the cycle. Mathematically, this constraint can be written as $$\sum_{s,d,t,c,p} x_{[s,d,t,c,p]}^{[\tau]} = 1, \forall s = 1, \ldots, n_{seams} \quad (13)$$

Second, every seam should be visited once and only once (in some combination of the remaining features). Note that do not have to visit every potential node. This constraint is mathematically captured by $$\sum_{\tau} \sum_{d,t,c,p} x_{[s,d,t,c,p]}^{[\tau]} = 1, \forall s = 1, \ldots, n_{seams} \quad (14)$$

within the QUBO formalism, these constraints may be capture through additional penalty terms given by $$H_{time} = P\sum_{\tau=1}^{n_{seams}} \left[\sum_{node} x_{node}^{[\tau]} - 1\right]^2 \quad (15)$$

$$H_{complete} = P\sum_{s=1}^{n_{seams}} \left[\sum_{\tau} \sum_{d,t,c,p} x_{[s,d,t,c,p]}^{[\tau]} - 1\right]^2 \quad (16)$$

with the penalty parameter P>0 enforcing the constraints. Note that the numerical value for P can be optimized in an outer loop. Finally, the total Hamiltonian describing the use case then reads $$H_{RM}=H_{cost}+H_{time}+H_{complete} \quad (17)$$

Because the Hamiltonian HRM is quadratic in the binary decision variables {x[$\tau$] node}, it falls into the broader class of QUBO problems, which is amenable to quantum-native solution strategies, for example in the form of quantum annealing, in addition to traditional classical solvers such as simulated annealing or tabu search.

This analysis may be completed with a rough estimate for the number of (logical) qubits nqubits required to implement this QUBO formulation for industry-relevant scales. With the number of time-steps for the Hamiltonian cycle given by $n_{seams}$ obtain $$n_{qubits} = 2 \times n_{seams}^2 \times n_{tools} \times n_{config} \times n_{position} \quad (18)$$

Taking numbers from a realistic industry-scale case use nseams~50, $n_{tools}$~3, $n_{config}$~10, and $n_{position}$ ~3, then find $n_{qubits}$~5×105. Furthermore, given the quadratic overhead for embedding an all-to-all connected graph onto the sparse Chimera architecture, estimate the required number of physical qubits Nqubits to be as large as $$N_{qubits} \sim 10^{11} \tag{19}$$

This number is much larger than the number of qubits available today and in the forseeable future, and higher connectivity between the physical qubits will be needed to reduce requirements for $N_{qubits}$. Therefore, utilize hybrid (quantum-classical) solvers which heuristically decompose the original QUBO problem into smaller subproblems that are compatible with hardware. These subproblems are then solved individually on a quantum annealing backend, and a global bitstring is recovered from the pool of individual, small-scale solutions by stitching together individual bitstrings.

Finally, for illustration purposes compare the size of the combinatorial search space any QUBO-based approach is exposed to, as compared to the native search space underlying the random key formalism. Disregarding (for simplicity) all complementary categorical features for now, the size of the search space for the QUBO formalism amounts to 2n2 seams while a native encoding has to search through the space of permutations of size nseams!. This means that for nseams~50 the latter amounts to ~1064 while the QUBO search space is many orders of magnitude larger, with 2502~10752 possible solution candidates, thus demonstrating the benefits of an efficient, native encoding for sequencing-type problems as relevant here.

Figure 5:
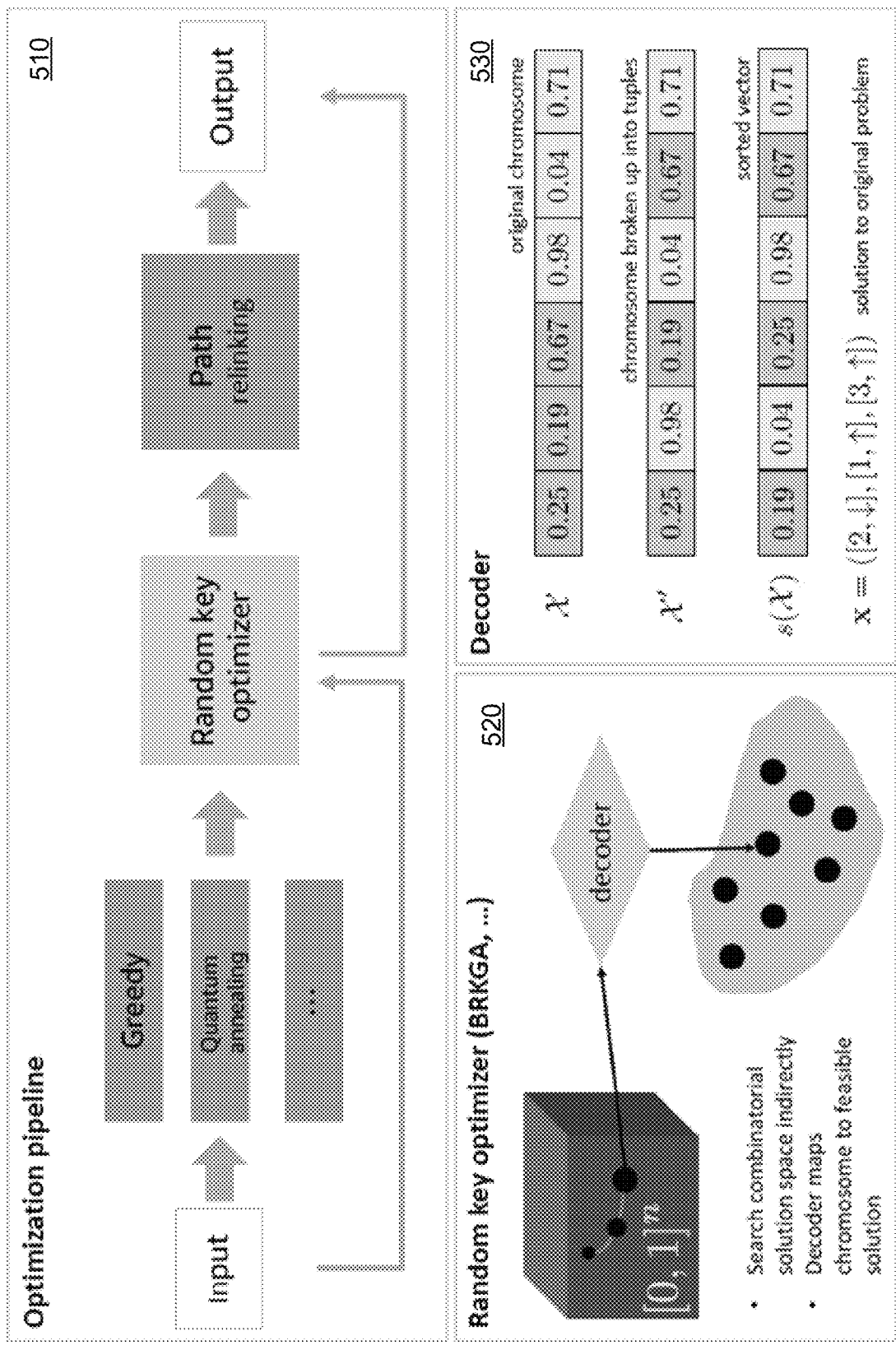
FIG. 5 is a logical block diagram illustrating an example optimization pipeline for generating a sequencing plan, according to some embodiments.

FIG. 5 is a logical block diagram illustrating an example optimization pipeline for generating a motion plan, according to some embodiments. As indicated at 510, a data flow of an example optimization pipeline is illustrated. The core routine takes the problem input, here specified in terms of cost values associated with pairs of nodes, and feeds this input into the random key optimizer (RKO). The latter heuristically searches for an optimized tour of composite nodes, which represents the pipeline's output. This core routine can be extended with additional upstream and downstream techniques for further solution refinement. Upstream solutions provided by alternative algorithms (such as greedy algorithms, quantum annealing, etc.) can be used to warm-start the RKO. A pool of different solutions may help identify high-quality solutions, adding high-quality diversity into the initial population of the RKO module. Downstream, further solution refinement can be achieved through path-relinking techniques, by forming superpositions of high-quality solution candidates.

As indicated at 520, a schematic illustration of a random key optimizer (RKO) is provided. The key characteristic of the RKO is a clear separation between problem-independent modules (as illustrated by the hypercube that hosts the chromosome X) and the problem-dependent, deterministic decoder that maps X to a solution of the original problem with associated cost (or fitness) value. The decoder may ensure that problem constraints (e.g., every node has to be visited exactly once) are satisfied. For example, in BRKGA the trajectory of the chromosome X is set by evolutionary principles, but generalizations to alternative algorithmic paradigms such as simulated annealing are straight-forward.

Element 530 provides an example illustration of the decoding of a chromosome X, made of random keys in (0, 1], into a solution to the original combinatorial optimization problem. Consider a sequencing problem paired with a binary decision variable (such as the binary direction variable d=↑, ↓) for n=3 composite nodes. The first block of the chromosome encodes the solution to the sequencing problem, while the second block encodes the additional binary variable, thus representing a minimal example for the concept of a composite node. The chromosome can be broken up into n tuples, one encoding a single node each. The decoder then performs simple sorting according to the first entry in the tuple, yielding the sorted vector s(X). Finally, the solution to the original problem x is given by the indices of this sorting routine paired with a simple threshold routine applied to the tuples' second entry. Here, the threshold is set at 0.5.

This specification continues with a general description of a provider network that implements multiple different services, including an optimization service, which may perform random key optimization for generating motion plans. Then various examples of the optimization service, including different components/modules, or arrangements of components/module that may be employed as part of implementing the optimization service are discussed. A number of different methods and techniques to implement random key optimization for generating sequencing plans are then discussed, some of which are illustrated in accompanying flowcharts. Finally, a description of an example computing system upon which the various components, modules, systems, devices, and/or nodes may be implemented is provided. Various examples are provided throughout the specification.

Figure 6:
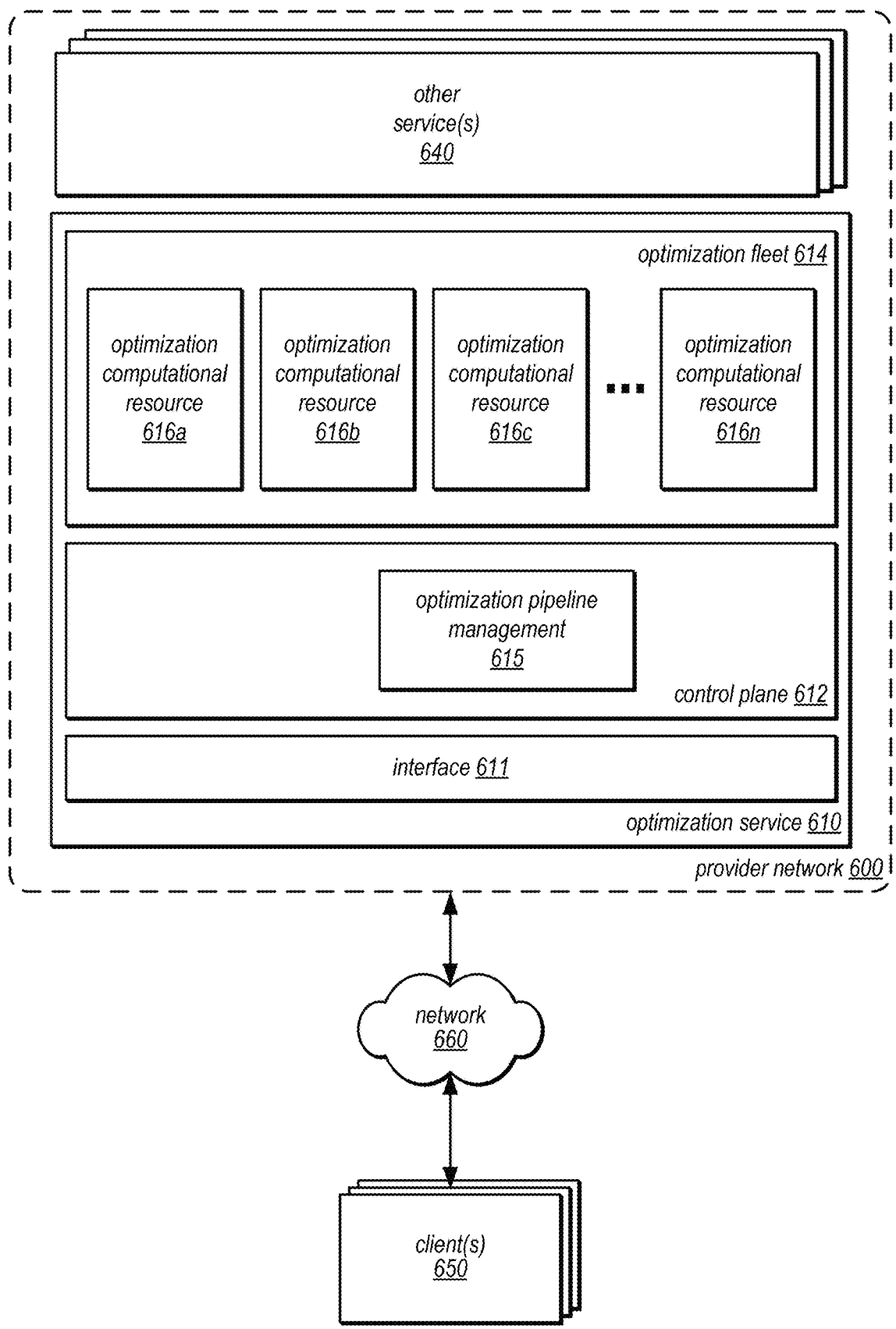
FIG. 6 illustrates an example provider network that may implement an optimization service, according to some embodiments.

FIG. 6 illustrates an example provider network that may implement an optimization service, according to some embodiments. Provider network 600 may be a private or closed system or may be set up by an entity such as a company or a public sector organization to provide one or more services (such as various types of cloud-based storage) accessible via the Internet and/or other networks to clients 650, in one embodiment. Provider network 600 (which may, in some implementations, be referred to as a "cloud provider network" or simply as a "cloud") refers to a pool of network-accessible computing resources (such as compute, storage, and networking resources, applications, and services), which may be virtualized or bare-metal. Provider network 600 can provide convenient, on-demand network access to a shared pool of configurable computing resources that can be programmatically provisioned and released in response to customer commands. These resources can be dynamically provisioned and reconfigured to adjust to variable load. For example, in some embodiments, provider network 600 may implement various computing resources or services, such as optimization service 610, and/or any other type of network-based services 640 (which may include a virtual compute service and various other types of storage, database or data processing, analysis, communication, event handling, visualization, data cataloging, data ingestion (e.g., ETL), and security services), in some embodiments.

The provider network 600 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 600 via a publicly accessible network (e.g., the Internet, a cellular communication network). Regions are connected to a global network which includes private networking infrastructure (e.g., fiber connections controlled by the cloud provider) connecting each region to at least one other region. The provider network 600 may deliver content from points of presence outside of, but networked with, these regions by way of edge locations and regional edge cache servers. This compartmentalization and geographic distribution of computing hardware enables the provider network 600 to provide low-latency resource access to customers on a global scale with a high degree of fault tolerance and stability.

In various embodiments, the components illustrated in FIG. 6 may be implemented directly within computer hardware, as instructions directly or indirectly executable by computer hardware (e.g., a microprocessor or computer system), or using a combination of these techniques. For example, the components of FIG. 6 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of optimization service 610 may be implemented by a particular node or may be distributed across several nodes. In some embodiments, a given node may implement the functionality of more than one service system component (e.g., more than one data store component).

Optimization service 610 may implement control plane 612 to support and manage various different interactions with clients of optimization service 610. For example, optimization service may include an interface 611 to allow clients (e.g., client(s) 650 or clients implemented internally within provider network 600, such as a client application hosted on another provider network service like a virtual compute service) to send requests for solutions to an optimization problem as discussed below with regard to FIG. 3. For example, an interface may be a graphical user interface, programmatic interface that implements Application Program Interfaces (APIs) and/or a command line interface.

Control plane 612 may dispatch different requests to different components. For example, as discussed in detail below with regard to FIG. 3, control plane 612 may dispatch a request to an optimization computational resource, such as optimization computational resource 616a, of optimization fleet 614, in various embodiments. Optimization fleet 614 may provide a set of computing resources, either as individual nodes, like optimization computational resources 616a, 616b, 616c through 616n, and/or groupings of resources (e.g., clusters of servers, instances, containers, or other computing systems or resources, such as discussed below with regard to computer system 1000 in FIG. 10) for performing various optimization techniques as discussed in detail above and below with regard to FIGS. 7-9. In some embodiments, some of optimization computational resources 616 may implement quantum hardware (as opposed to the classical hardware discussed below with regard to FIG. 10). Such quantum computing hardware may include quantum annealing devices (as discussed above with regard to FIG. 4).

Control plane 612 may also implement optimization solution management 615 to, among other features, select the appropriate number, size, and/or configuration of optimization computational resources 616 for an optimization job as discussed in detail below with regard to FIGS. 7 and 8, in some embodiments.

Generally speaking, clients 650 may encompass any type of client that can submit network-based requests to provider network 600 via network 660, including requests for optimization service 610 (e.g., a request to solve an optimization problem, etc.). For example, a given client 650 may include a suitable version of a web browser, or may include a plug-in module or other type of code module that can execute as an extension to or within an execution environment provided by a web browser. Alternatively, a client 650 may encompass an application such as an application that may make use of optimization service 610 to implement various applications. For example, a client 650 may perform a request to generation a sequencing plan as part of an application that can utilize the sequencing plan to instruct various automated systems, such as factory robots as discussed in the examples above, or other autonomous or manually operated machinery or vehicles. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 650 may be an application that can interact directly with provider network 600. In some embodiments, client 650 may generate network-based services requests according to a Representational State Transfer (REST)-style network-based services architecture, a document or message-based network-based services architecture, or another suitable network-based services architecture.

In some embodiments, a client 650 may provide access to provider network 600 to other applications in a manner that is transparent to those applications. Clients 650 may convey network-based services requests (e.g., optimization solution requests for motion plans) via network 660, in some embodiments. In various embodiments, network 660 may encompass any suitable combination of networking hardware and protocols necessary to establish network-based-based communications between clients 650 and provider network 600. For example, network 660 may generally encompass the various telecommunications networks and service providers that collectively implement the Internet. Network 660 may also include private networks such as local area networks (LANs) or wide area networks (WANs) as well as public or private wireless networks, in one embodiment. For example, both a given client 650 and provider network 600 may be respectively provisioned within enterprises having their own internal networks. In such an embodiment, network 660 may include the hardware (e.g., modems, routers, switches, load balancers, proxy servers, etc.) and software (e.g., protocol stacks, accounting software, firewall/security software, etc.) necessary to establish a networking link between given client 650 and the Internet as well as between the Internet and provider network 600. It is noted that in some embodiments, clients 650 may communicate with provider network 600 using a private network rather than the public Internet.

Figure 7:
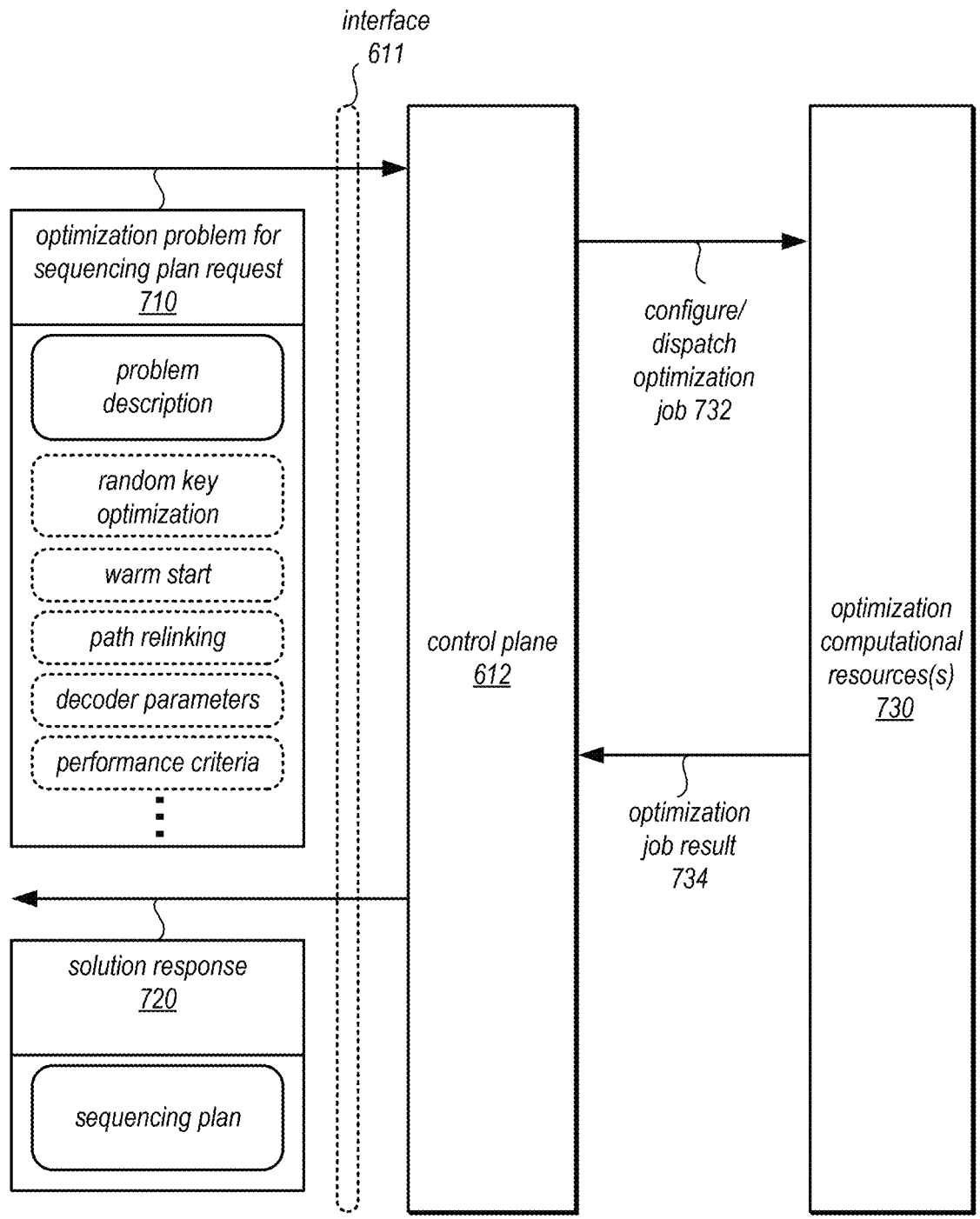
FIG. 7 illustrates a logical block diagram illustrating interactions to request a sequencing plan generated from an optimization problem solution, according to some embodiments.

FIG. 7 illustrates a logical block diagram illustrating interactions to request a sequencing plan generated from an optimization problem solution, according to some embodiments. An optimization problem for sequencing plan request 710 may be received at optimization service 610 via an interface 611 (e.g., one of the various types of interfaces discussed above). Optimization problem for sequencing plan request 710 may include various features, such as a problem encoding, like the matrix (or tensor) encodings according to various models for the sequencing plan (e.g., such as the example matrix discussed above). Various other features to configure or affect the execution of optimization problem for sequencing plan request may be included, in some embodiments. For example, a selection of a random key optimization technique, warm start technique, and path re-linking technique may be included. In some embodiments, various sequencing plan constraints, such as performance criteria for generating the sequencing plan (e.g., computational time, resource consumption limits, etc.) may be included in request 710.

Control plane 612 may configure and/or dispatch 732 an optimization job to a selected optimization computational resource or set of computational resources 730. For example, different optimization computational resources may utilize different hardware for performing different types of. Control plane 612 may determine from request 710 which optimization computational resource(s) would support the performance of the combinatorial problem optimization according to request 710 and dispatch the request accordingly, as indicated 732, as discussed in detail below with regard to FIG. 8. In some embodiments, control plane 612 may provision or otherwise configure optimization computational resource(s) 730 to be capable of executing the optimization job (e.g., installing or requesting various software or other features to be implemented on optimization computational resources(s) 730).

Optimization computational resource(s) 730 may execute the optimization job using a configured optimization pipeline. Various instructions and/or other information, such as the optimization problem encoding, may be provided to optimization computational resource(s) 730 to generate and return an optimization job result 734 (as discussed in more detail below with regard to FIG. 8). Front-end 612 may then provide via interface 702 send solution response 720, which may include the motion plan.

Figure 8:
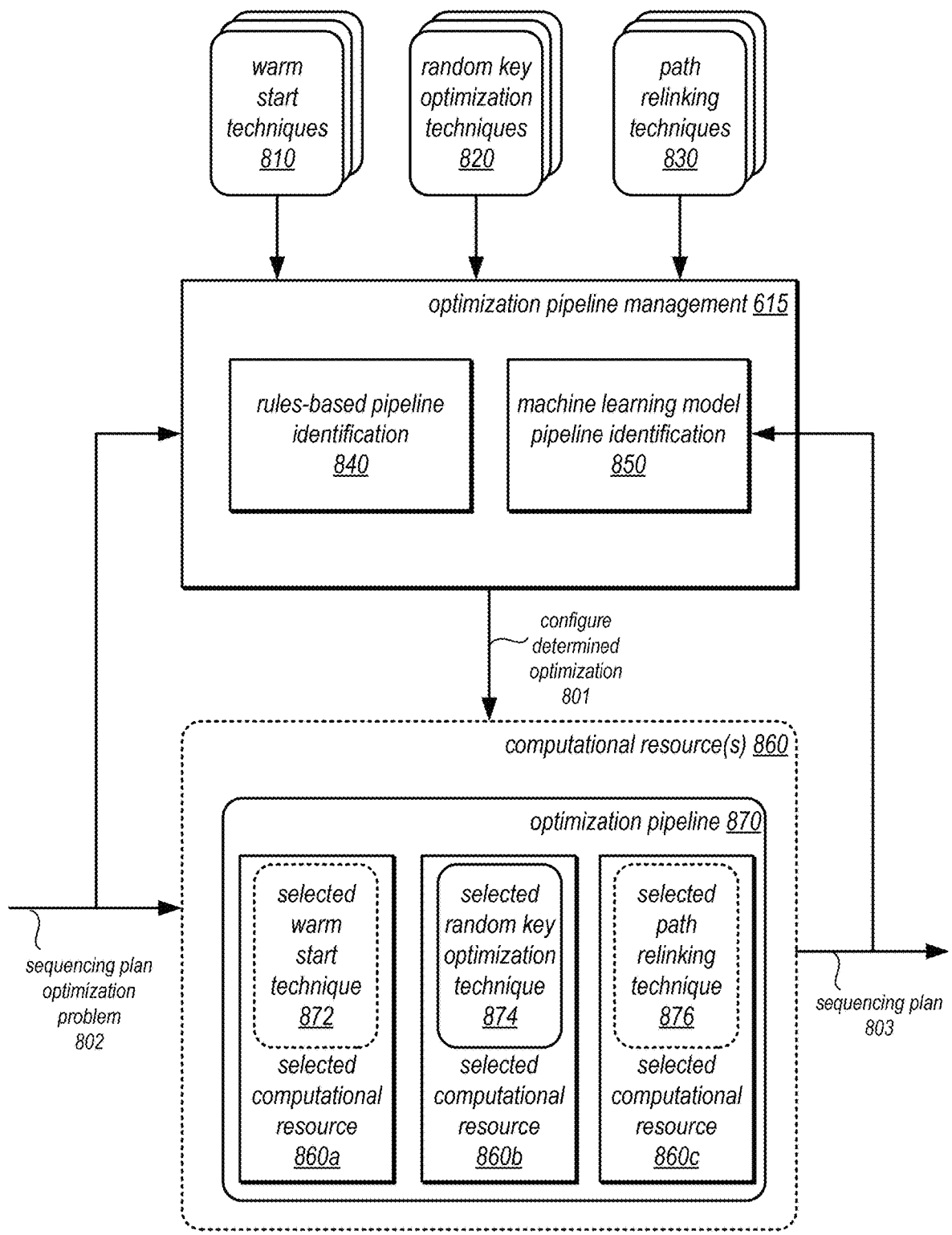
FIG. 8 is a logical block diagram illustrating optimization pipeline determination and execution, according to some embodiments.

FIG. 8 is a logical block diagram illustrating optimization pipeline determination and execution, according to some embodiments. Optimization pipeline management 615 may implement various features to determine the optimization pipeline for performing an optimization request to generate a motion plan. As discussed above, different features of an optimization plan may include one of the various random key optimization techniques 820 (e.g., gradient-free techniques and gradient-based methods), and, possibly, a warm start technique 810 and/or a path relinking technique 830.

Optimization pipeline management 615 may implement different techniques for making an optimization pipeline determination. For example, in some embodiments, a rules-based pipeline identification 840 may be implemented. One or more different rules sets may be evaluated with respect to an optimization request. The optimization request may, for instance, specify the optimization pipeline explicitly (e.g., by identifiers of corresponding techniques for warm start, random key optimization and path re-linking). Rules-based pipeline identification 840 may include a rule set for recognizing and applying specified techniques. Rules-based pipeline identification 840 may also implement various heuristics or other evaluation criteria to select (without being specified in the optimization request) from the techniques to determine the optimization pipeline. For example, the size of the optimization problem (e.g., in terms of the number of nodes/decision variables) may be used to select between different ones of the techniques. Other rules which may, for instance, link specific types of sequencing plans to specific combinations of techniques (e.g., robot motion planning techniques use warm start technique X, random-key optimization technique Y, and path-relinking technique Z). In some embodiments, rules may consider other information, such as computational time limitations or costs in order to select the techniques.

In some embodiments, optimization pipeline management 615 may implement machine learning model pipeline identification 850. Machine learning model pipeline identification 850 may be generate an inference (e.g., prediction) of an optimal configuration for an optimization pipeline based on the performance of different optimization pipelines for different optimization problems for sequence planning. Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time. In this implementation, the training data may be the historical performance of optimization pipelines for optimization problems for sequence planning (e.g., an unsupervised learning technique), although other embodiments may make used of labeled training data to implement a supervised learning technique. The features of an optimization problem may be encoded (e.g., as an input vector) and then processed through the machine learning model which may produce a prediction of the optimal techniques (e.g., at least a random key optimization technique, and possibly warm start technique and path re-linking technique).

Once determined, optimization pipeline management 615 may provision and configure 801 computational resource(s) 860 for the determined optimization pipeline. For example, each of the techniques may be implemented on a combination of one or more different selected computational resources, such as 860*a*, 860*b*, and 860*c*, which may be classical computing hardware, quantum computing hardware, or some combination of both. The selected random key optimization technique 874, as well as possibly selected warm start technique 872 and selected path re-linking technique 876 may be included in optimization pipeline 870. For example, a configuration file or other optimization pipeline specification framework may be generated that includes the selected techniques, which allow computational resource(s) 860 to read, invoke, and generate a sequencing plan 803 according to the received sequencing plan optimization problem 802. As noted above, in some embodiments, classical computing hardware may be used in combination with quantum computing hardware, and thus computational resource(s) 860 may be a combination of different types of hardware according to the configuration of optimization problem 870. Note that the generated sequencing plan 803 may be used to provide feedback and tune machine learning model for pipeline identification 850, in some embodiments.

Although FIGS. 6-8 have been described and illustrated in the context of a provider network implementing an optimization service, the various components illustrated and described in FIGS. 6-8 may be easily applied to other systems that utilize sequence planning. As such, FIGS. 6-8 are not intended to be limiting as to other embodiments of random key optimization for generating motion plans.

Figure 9:
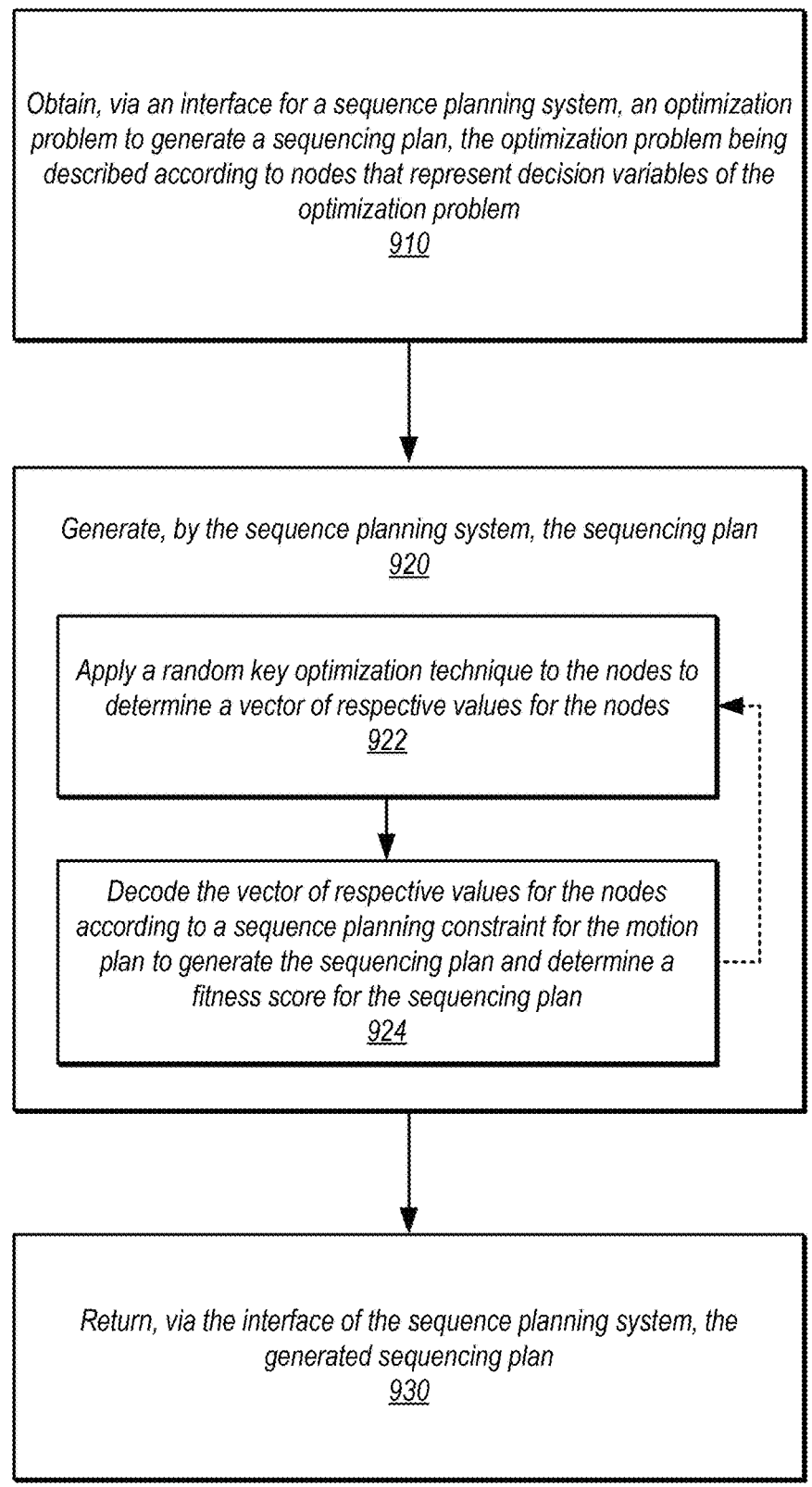
FIG. 9 illustrates a high-level flowchart of various methods and techniques to implement random key optimization for generating sequencing plans, according to some embodiments.

FIG. 9 illustrates a high-level flowchart of various methods and techniques to implement random key optimization for generating motion plans, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 910, an optimization problem to generate a sequencing plan may be obtained via an interface for a sequence planning system, in some embodiments. The optimization problem may be described according to nodes that represent the decision variables of the optimization problem, as discussed in detail above.

As indicated at 920, the sequencing plan may be generated by the sequence planning system. As indicated at 922, generation may include applying a random key optimization technique to the nodes to determine a vector of respective values for the nodes, in some embodiments. As noted above, various different random key optimization techniques may be used. The vector of respective values for the nodes may be decoded according to a sequence planning constraint for the sequencing plan to generate the sequencing plan and determine a fitness score for the motion plan, as indicated at 924, in some embodiments. The decoding technique may be problem-specific, while the random key optimization technique may be problem-independent.

As indicated at 930, the generated sequencing plan may be returned via the interface of the sequence planning system, in some embodiments. For example, the sequencing plan may include a programmatically specified set of instructions, operations, movements (or a combination of both) output in interface commands, a machine interpretable document (e.g., a Javascript Object Notation (JSON) document), or other format which may be executable to program or otherwise cause performance of the sequencing plan.

The methods described herein may in various embodiments be implemented by any combination of hardware and software. For example, in one embodiment, the methods may be implemented on or across one or more computer systems (e.g., a computer system as in FIG. 10) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
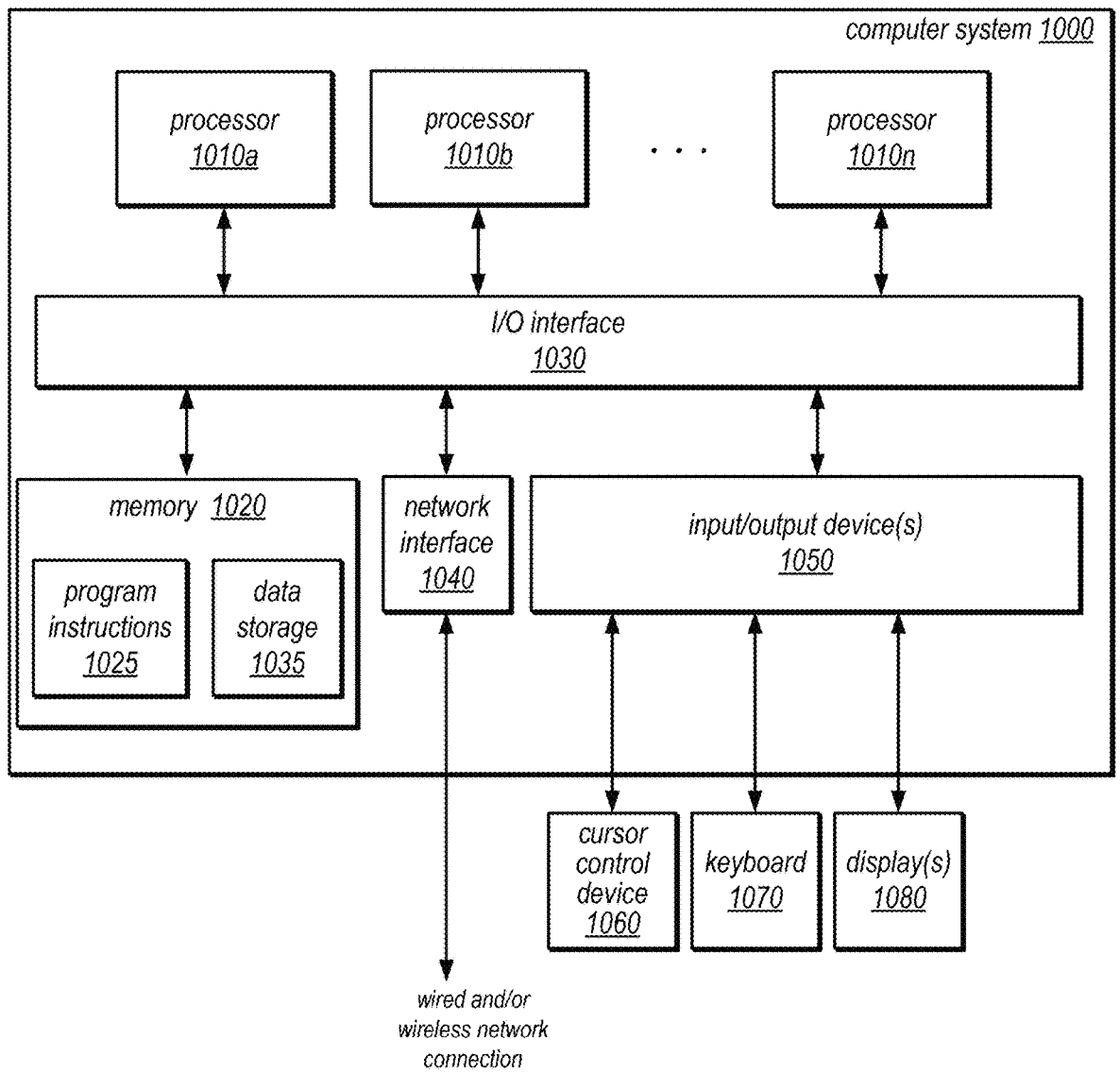
FIG. 10 illustrates an example system to implement the various methods, techniques, and systems described herein, according to some embodiments.

Embodiments of random key optimization for generating sequencing plans as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to:
   receive, via an interface, an optimization problem to generate a robotic motion plan, wherein the optimization problem is described according to a plurality of nodes that represent decision variables of the optimization problem;
   determine and execute an optimization pipeline compatible with both classical computing hardware and quantum computing hardware to generate the robotic motion plan, wherein the optimization pipeline comprises:
   application of a random key optimization technique using the classical computing hardware or the quantum computing hardware to the plurality of nodes to determine a vector of respective values for the plurality of nodes; and
   decode of the vector of respective values for the plurality of nodes according to a motion planning constraint for the motion plan to generate the motion plan and determine a fitness score for the robotic motion plan; and
   return, via the interface, the robotic motion plan generated by the determined optimization pipeline, wherein the robotic motion plan is one of a plurality of robotic motion plans generated according to the random key optimization technique, the robotic motion plan being selected according to the fitness score for the robotic motion plan.

2. The system of claim 1, wherein the optimization pipeline further includes a warm start stage that generates initial values to be used by the random key optimization technique.

3. The system of claim 1, wherein the optimization pipeline further includes a path relinking stage that evaluates multiple possible solutions decoded from possible solution vectors, including the vector, to determine a further possible solution sampled from the multiple possible solutions and generate a fitness score for the further possible solution.

4. The system of claim 1, wherein the motion planning system is an optimization service implemented as part of a provider network and wherein the interface is an interface of the optimization service that receives the optimization problem from a client of the provider network.

5. A method, comprising:
   obtaining, via an interface for a sequence planning system, an optimization problem to generate a sequencing plan, wherein the optimization problem is described according to a plurality of nodes that represent decision variables of the optimization problem;
   generating, by the sequence planning system using an optimization pipeline compatible with both classical computing hardware and quantum computing hardware, the motion plan, comprising:
   applying a random key optimization technique using the classical computing hardware or the quantum computing hardware to the plurality of nodes to determine a vector of respective values for the plurality of nodes; and
   decoding the vector of respective values for the plurality of nodes according to a sequence planning constraint for the sequencing plan to generate the sequencing plan and determine a fitness score for the sequencing plan; and
   returning, via the interface of the sequence planning system, the generated sequencing plan.

6. The method of claim 5, wherein generating the sequencing plan further comprises applying a warm start technique to generate initial values to be used by the random key optimization technique.

7. The method of claim 5, wherein generating the sequencing plan further comprises applying a path relinking technique that evaluates multiple possible solutions decoded from possible solution vectors, including the vector, to determine a further possible solution sampled from the multiple possible solutions and generate a fitness score for the further possible solution.

8. The method of claim 5, wherein the random key optimization technique is one of a plurality of random key optimization techniques that are supported by the sequence planning system, and wherein the random key optimization technique is specified in a request received via the interface of the sequence planning system.

9. The method of claim 5, wherein sequence planning constraint is specified as part of a request received via the interface of the sequence planning system.

10. The method of claim 5, wherein the random key optimization technique is a gradient free optimization technique.

11. The method of claim 5, wherein the random key optimization technique is one of a plurality of random key optimization techniques that are supported by the sequence planning system, and wherein the random key optimization technique is selected according to a machine learning model trained to select one random key optimization technique out of the plurality of random optimization techniques based on the obtained optimization problem.

12. The method of claim 5, wherein applying the random key optimization technique uses the quantum computing hardware.

13. The method of claim 5, wherein generating the sequencing plan further comprises applying a path relinking technique that evaluates multiple possible solutions decoded from possible solution vectors, including the vector, to determine a further possible solution sampled from the multiple possible solutions and generate a fitness score for the further possible solution and wherein applying the path relinking technique uses the quantum computing hardware.

14. One or more non-transitory, computer-readable storage media, storing program instructions that when executed on or across one or more computing devices cause the one or more computing devices to implement:
  obtaining an optimization problem to generate a sequencing plan, wherein the optimization problem is described according to a plurality of nodes that represent decision variables of the optimization problem;
  generating the sequencing plan using an optimization pipeline compatible with both classical computing hardware and quantum computing hardware, wherein, in generating the sequencing plan, the program instructions cause the one or more computing devices to implement:
    causing application of a random key optimization technique using the classical computing hardware or the quantum computing hardware to the plurality of nodes to determine a vector of respective values for the plurality of nodes; and
    causing decode of the vector of respective values for the plurality of nodes according to a sequence planning constraint for the sequencing plan to generate the sequencing plan and determine a fitness score for the sequencing plan; and
  providing the generated sequencing plan.

15. The one or more non-transitory, computer-readable storage media of claim 14, wherein, in generating the sequencing plan, the program instructions cause the one or more computing devices to implement applying a warm start technique to generate initial values to be used by the random key optimization technique.

16. The one or more non-transitory, computer-readable storage media of claim 14, wherein, in generating the sequencing plan, the program instructions cause the one or more computing devices to implement applying a path relinking technique that evaluates multiple possible solutions decoded from possible solution vectors, including the vector, to determine a further possible solution sampled from the multiple possible solutions and generate a fitness score for the further possible solution.

17. The one or more non-transitory, computer-readable storage media of claim 14, wherein the random key optimization technique is one of a plurality of random key optimization techniques that are supported, and wherein the random key optimization technique is specified in a received request.

18. The one or more non-transitory, computer-readable storage media of claim 14, wherein the random key optimization technique is a gradient-based optimization technique.

19. The one or more non-transitory, computer-readable storage media of claim 14, wherein generating the sequencing plan uses a combination of two or more techniques executing on quantum computing hardware.

20. The one or more non-transitory, computer-readable storage media of claim 14, wherein the one or more computing devices are implemented as part of an optimization service implemented as part of a provider network and wherein the interface is an interface of the optimization service that receives the optimization problem from a client of the provider network.

* * * * *